United States Patent [19]
Loziuk

[11] Patent Number: 5,482,259
[45] Date of Patent: Jan. 9, 1996

[54] PIPE RESTRAINT

[75] Inventor: Lawrence A. Loziuk, Vernon Hills, Ill.

[73] Assignee: Vectra Technologies, Inc., Wash.

[21] Appl. No.: 320,740

[22] Filed: Oct. 11, 1994

Related U.S. Application Data

[63] Continuation of Ser. No. 978,018, Nov. 19, 1992, Pat. No. 5,360,210, which is a continuation-in-part of Ser. No. 915,477, Jul. 19, 1992, Pat. No. 5,240,232, which is a continuation-in-part of Ser. No. 808,132, Dec. 19, 1991, abandoned.

[51] Int. Cl.⁶ ........................................ F16F 3/00
[52] U.S. Cl. ................ 267/136; 267/148; 248/570; 248/626; 248/628; 248/901
[58] Field of Search ........................... 267/148, 154, 267/136, 147, 149; 248/618, 636, 611, 562, 570, 638, 626, 628, 901, 630, 603; 188/378

[56] References Cited

U.S. PATENT DOCUMENTS

| | | | |
|---|---|---|---|
| 2,421,822 | 6/1947 | Wood | 248/54 |
| 3,025,031 | 3/1962 | Kerley | 267/148 |
| 3,044,759 | 7/1962 | Kerley | 267/148 |
| 3,057,593 | 10/1962 | Kerley | 248/570 |
| 3,065,959 | 11/1962 | Kerley et al. | 248/570 |
| 3,074,681 | 1/1963 | Kerley | 267/148 |
| 3,086,600 | 4/1963 | Kerley | 248/570 |
| 3,204,911 | 9/1965 | Lawrence et al. | 248/358 |
| 3,204,913 | 9/1965 | Lawrence et al. | 267/148 |
| 3,239,207 | 3/1966 | Camossi | 267/1 |
| 3,360,225 | 12/1967 | Camossi | 267/148 |
| 3,371,895 | 3/1968 | Speranza | 267/148 |
| 3,596,865 | 8/1971 | Camossi | 267/148 |
| 4,190,227 | 2/1980 | Belfield et al. | 248/536 |
| 4,397,069 | 8/1983 | Camossi | 29/173 |
| 4,620,688 | 11/1986 | Khlafallah et al. | 248/542 |
| 4,783,038 | 11/1988 | Gilbert et al. | 248/570 |
| 4,854,556 | 8/1989 | Pietrzak | 248/570 |
| 4,955,467 | 9/1990 | Kallenbach | 188/381 |
| 5,062,507 | 11/1991 | Roche | 188/378 |
| 5,149,066 | 9/1992 | Snaith et al. | 267/136 |
| 5,160,121 | 11/1992 | Bartholomew | 267/136 |
| 5,169,110 | 12/1992 | Snaith et al. | 248/570 |

FOREIGN PATENT DOCUMENTS

| | | |
|---|---|---|
| 3302852 | 8/1984 | Germany . |
| 6023647 | 6/1985 | Japan . |

OTHER PUBLICATIONS

"A Wire Rope Seismic Support," Larry A. Loziuk, *Nuclear Engineering and Design* 107/pp. 201–204, Jun. 1, 1987.

"A Wire Rope Seismic Support," Larry A. Loziuk, *Nuclear Engineering and Design*, vol. 107, 1988, Amsterdam, pp. 201–204.

US, A, 3,239,207 (C. Camossi), 8 Mar. 1966.
DE, A, 3,302,852 (W. & G. Esser GmbH), 9 Aug. 1984.
Patent Abstracts of Japan, vol. 9, No. 146(M–389)21 Jun. 1985 & JP, A. 60,023,647 (Toshibakk) 6 Feb. 1985.

*Primary Examiner*—Mark T. Le
*Attorney, Agent, or Firm*—Christensen, O'Connor, Johnson & Kindness

[57] ABSTRACT

A pipe restraint having a helical isolator ($I^1$) coupled to a housing (16) and including a central cylinder (4) coupled to a central rod (2). Connecting rods (34, 36) are located at opposite ends of the restraint to attach the restraint between a pipe and an adjacent structure. Wire energy absorbing rope bights (32) are used to form the isolator $I^1$. The bights (32) are placed in a state of precompression and have bi-linear spring properties which may be adjusted by adjusting the diameter of the housing (16) and spacer bar (30).

13 Claims, 19 Drawing Sheets

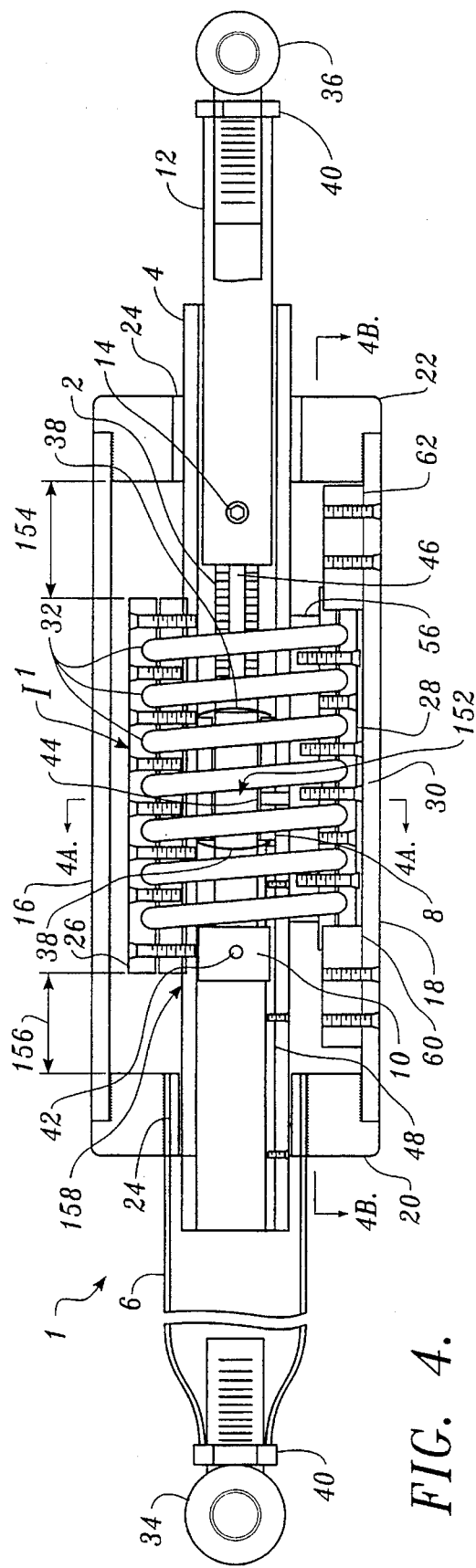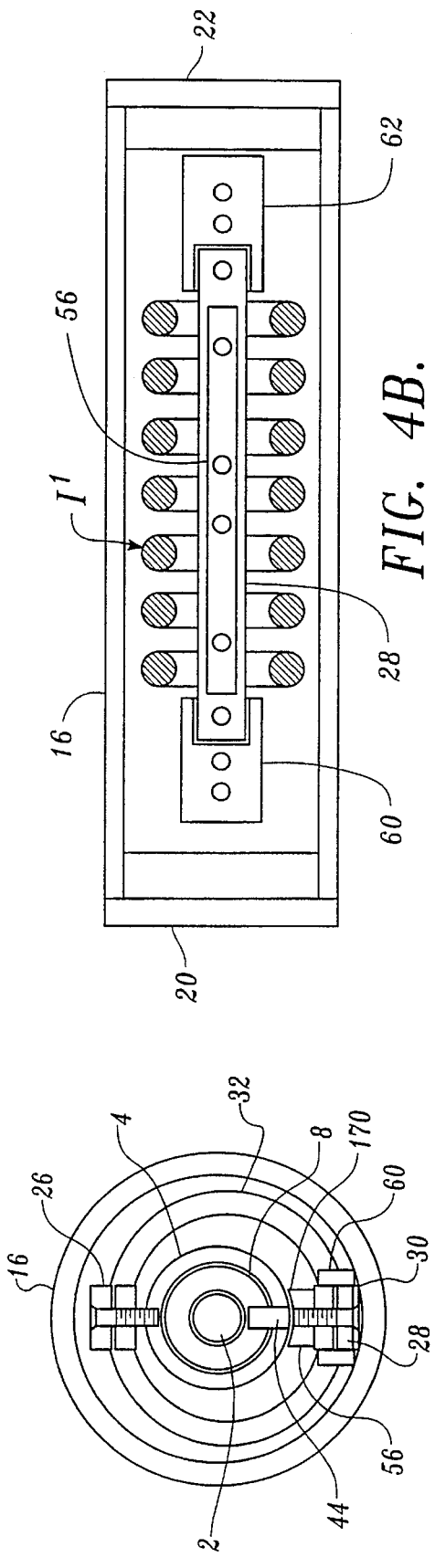

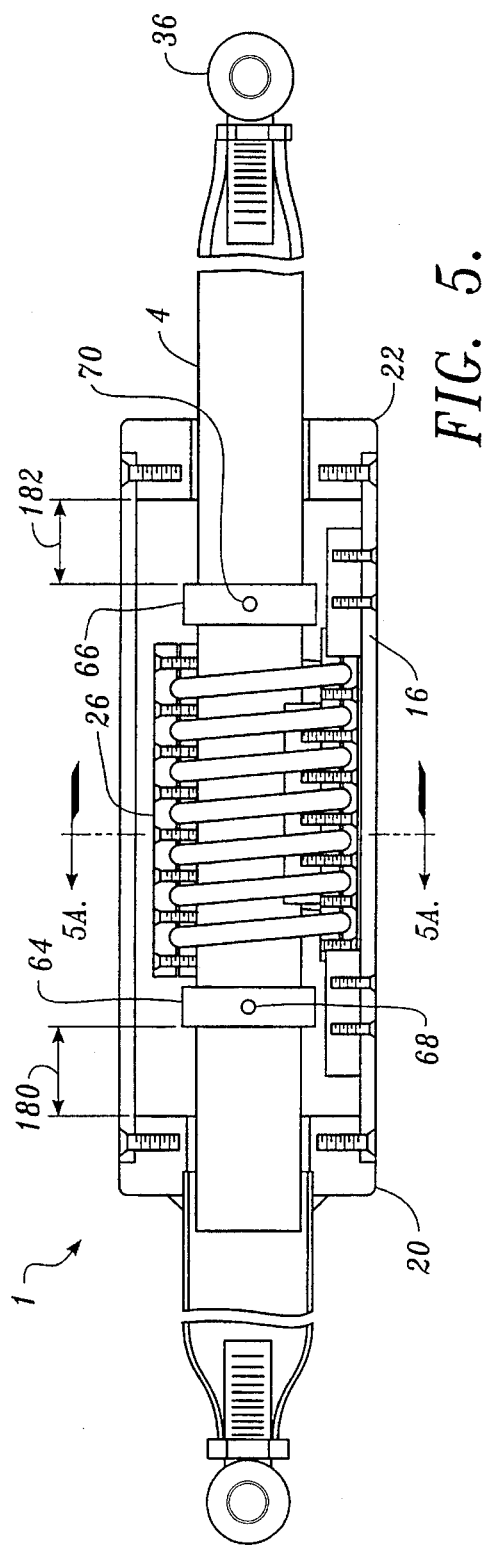
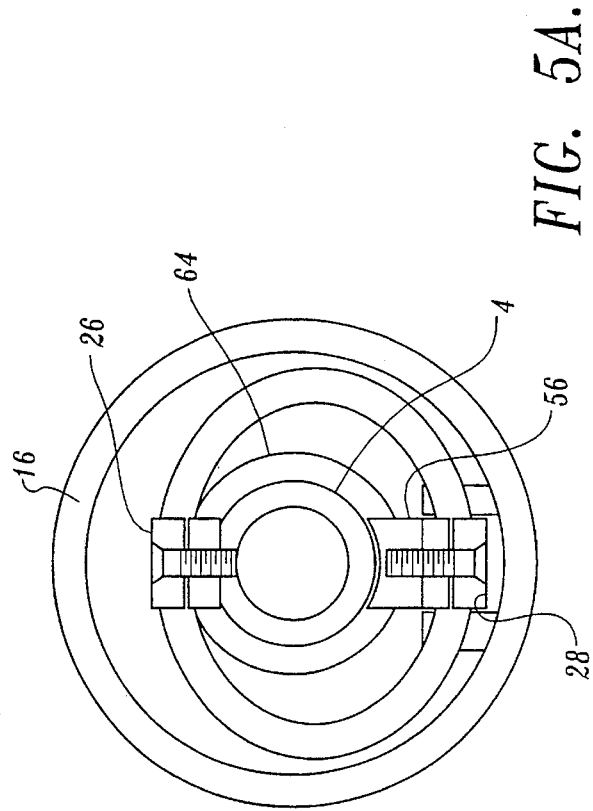
FIG. 5.
FIG. 5A.

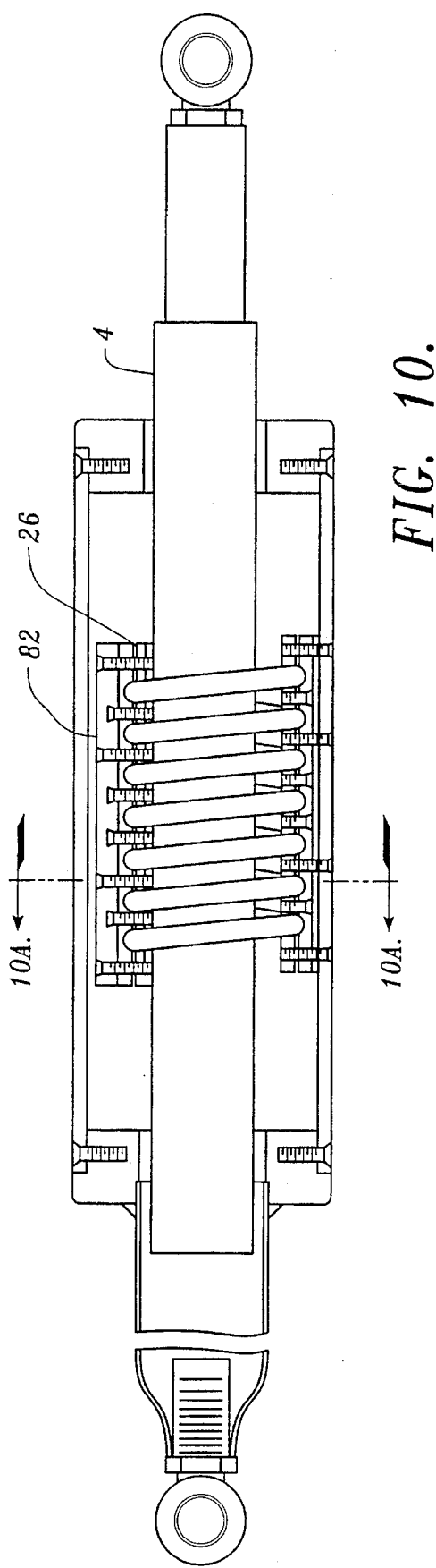
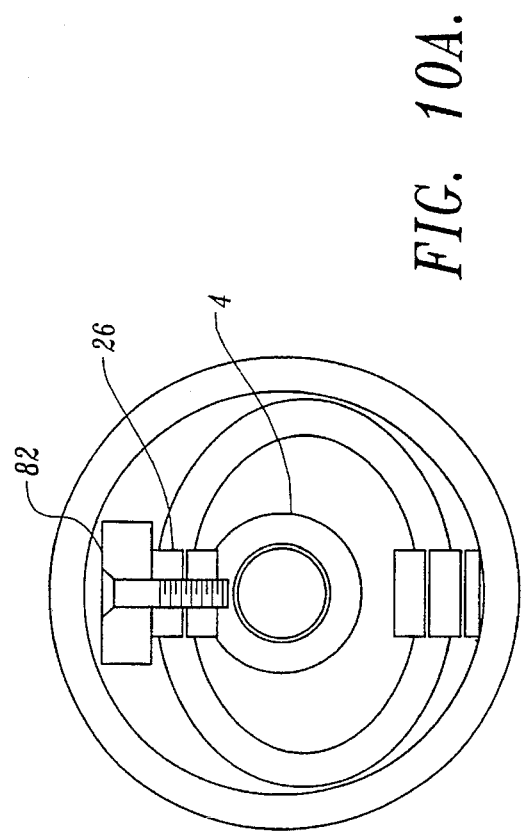
FIG. 10.
FIG. 10A.

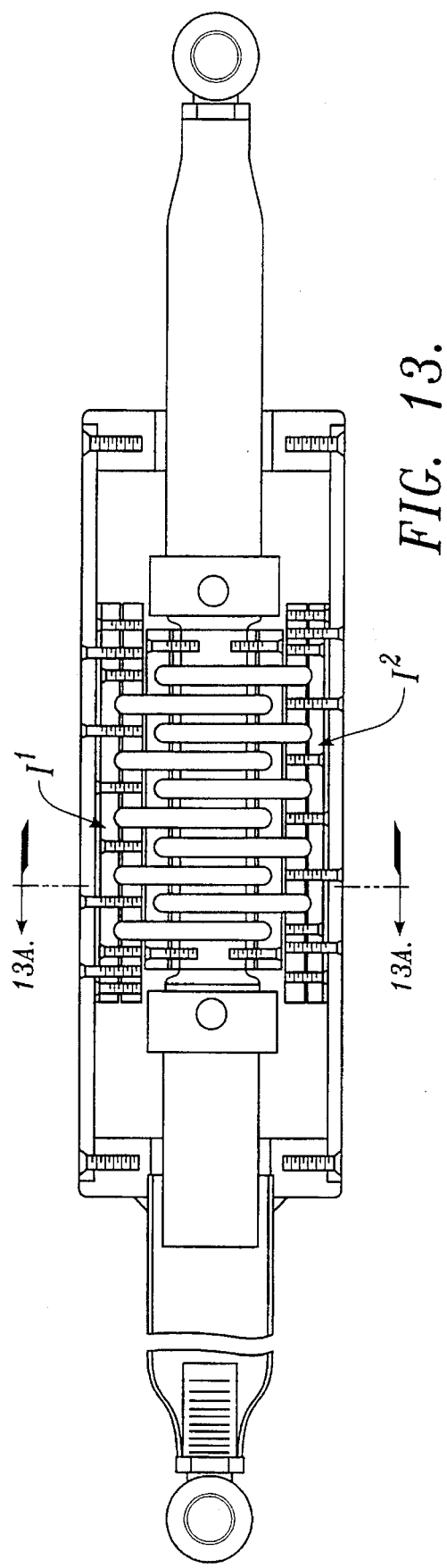
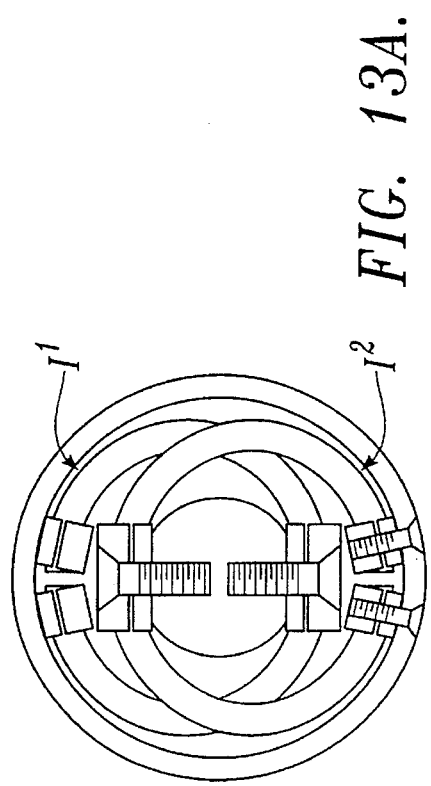
FIG. 13.
FIG. 13A.

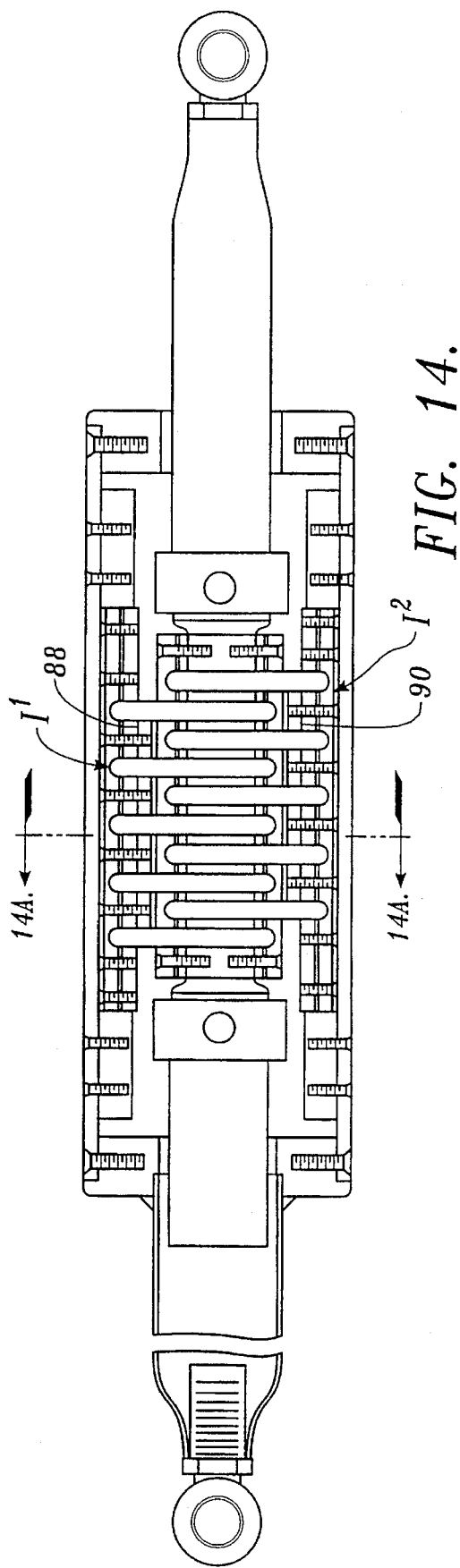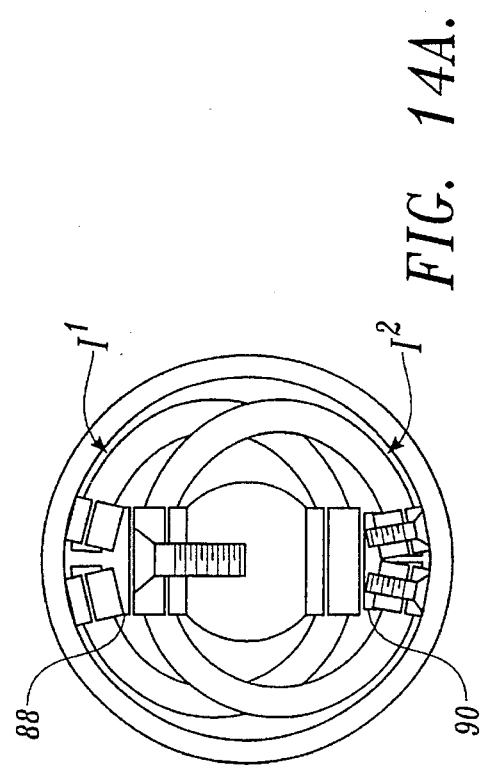

PIPE RESTRAINT

This application is a continuation of U.S. patent application Ser. No. 07/978,018, filed on Nov. 18, 1992, now U.S. Pat. No. 5,360,210; which is a Continuation-In-Part of U.S. patent application Ser. No. 07/915,477, filed on Jul. 16, 1992, now U.S. Pat. No. 5,240,232; which is a Continuation-In-Part of U.S. patent application Ser. No. 07/808,132, filed on Dec. 16, 1991, now abandoned.

BACKGROUND OF THE INVENTION

Piping systems are typically anchored at two or more ends by the process equipment they connect. As the pipe expands due to thermal growth induced by a hot process fluid, it will deform as shown in FIG. 1. If restraints are required to limit dynamic displacements at locations on the pipe which also have thermal movements, a design conflict will exist. This is true in electrical generating plants, for example, where thermal pipe growth may approach 450 mm (18 inches).

For example, if one was to place rigid restraint at Point A, as shown in FIG. 1A, the pipe would not expand as shown in FIG. 1 and may result in an over-stressed condition in the pipe or an unacceptable load on the process equipment. Industry traditionally has resolved this conflict with the use of snubbers. Snubbers allow the pipe to freely expand but momentarily restrain the pipe during a dynamic event. Both mechanical and hydraulic snubbers commonly have been used to restrain piping systems. The problems with snubbers are that they are complex, require maintenance and have a history of failure. These problems have resulted in costly inspection programs in, for example, the nuclear industry. This in turn has prompted many utilities to reduce snubber populations and consider alternatives.

An alternative to snubbers is the use of gapped supports. The disadvantage of this form of dynamic restraint is that it absorbs no energy and imparts very high impact loads on the structure.

Another alternative to snubbers is the use of energy absorbers. Others have proposed varying forms of energy absorbers. One type uses steel plates to absorb energy through plastic deformation of the plates as disclosed in U.S. Pat. No. 4,620,688. A drawback of this device is its low cycle fatigue life. Other proposed types of energy absorbers are shown in U.S. Pat. Nos. 4,955,467 and 4,901,829. Energy is absorbed by friction in these devices. A major drawback of these patented devices are the large mount of variability in the resulting friction force.

In yet another device, the basic element of the restraint is the multi-stranded helical cable trapped between two plates such that energy is absorbed by the deformation of the cable when vibration occurs. This component of the device, known as an "isolator", has been utilized by the military, in satellites, warships, space shuttles, aircraft, off-road vehicle applications, and other areas for many years. The primary use of isolators has been to minimize the transmission of vibration from one component to another. A major producer of isolators is AEROFLEX International, Inc. of Plainview, N.Y., 11805, assignee of U.S. Pat. Nos. 4,783,038 and 4,190,227 related to isolators.

For other related prior art see U.S. Pat. Nos. 2,421,822, 3,204,911, and 4,397,069.

The inventor first considered the use of helical rope isolators as a pipe restraint in 1984. It was thought that the device would be a good seismic restraint which could replace snubbers on piping systems. Conversations with AEROFLEX, a major supplier of isolators, indicated that they did not think it would work well as an isolator due to the relatively low frequency content of the typical building response to an earthquake. The inventor's thoughts, at that time, were not to isolate the pipe from structure in order to minimize the seismic inputs to the pipe, but to use the device to add damping to the piping system and to maintain pipe displacement to acceptable levels during a seismic event. He recognized that while snubbers limited displacements, they added little damping to the system.

In 1984, accordingly, he built a test set-up to determine the response of a pipe supported with and without the isolators. Test results were very favorable, based on the amount of additional damping the isolator provided the system. He presented the results of the experiment in 1986 at the "Symposium on Current Issues Related to Nuclear Power Plant Structures, Equipment and Piping" at North Carolina State University. Those same results were later published in *Nuclear Engineering and Design* in 1988. This paper is identified as "Vol. 107, North-Holland, Amsterdam, 1988, pp. 201–204".

Based on the encouraging test results, the inventor began to promote the idea of using isolators as a pipe restraint for seismic and hydraulic transient applications. This was done primarily at Commonwealth Edison Company and through public seminars he gave on piping design.

A commercial piping application occurred in 1990 when Commonwealth Edison elected to try isolators on a piping system which was causing a floor slab, to which the pipe was connected, to vibrate at unacceptable levels. The inventor incorporated helical isolators into a design which differs from the invention and allowed the existing pipe support hardware to be utilized. Pipe thermal expansion was not an issue in that case since the pipe was previously supported by rigid supports at the problem locations. It is also noted that in that particular application, the primary purpose of the device was to act as an isolator. The isolator application decoupled the pipe from the floor slab so as to minimize the pipe vibration input to the floor slab. This was a classical application of isolators. The secondary purpose of the device was to minimize the amplitude of the pipe vibration. This installation was a success.

The use of isolators as a pipe restraint has been promoted by the inventor for a number of years, however, the invention includes a new discovery which has not been previously known.

A principal problem in using isolators is that the conflict of design requirements between pipe thermal expansion and a system for restraint of dynamic events has not been solved. While the use of an isolator can provide for some thermal expansion, it is generally limited to small mounts due to the restraining spring force the isolator imparts to the pipe. This provides for limited use of isolators as pipe restraints since direct use of conventional isolators as a pipe restraint results in the same conflict of design requirements between thermal expansion and restraining dynamic displacements. An isolator is a spring. For thermal expansion considerations, a soft spring is desirable so as to not over-stress the pipe or overload the terminating equipment. For dynamic events, however, a stiff spring is desirable since it is desired to limit the magnitude of the dynamic displacements.

An invention which is an energy absorption and pipe displacement limiting device of simple construction, ease of inspection and minimal maintenance was filed with the U.S. Patent Office on Dec. 16, 1991 as U.S. application Ser. No. 07/808,132. An improvement to this patent application was filed with the U.S. Patent Office on Jul. 16, 1992 as patent application Ser. No. 07/915,477. The filed inventions act as a pipe restraint for connection between a pipe subject to movement due both to dynamic loads and to thermal deformations and an adjacent structure. They are adjustable in turnbuckle-like fashion and possesses symmetric stiffness in both tension and compression which resists buckling under load.

U.S. patent application Ser. No. 07/915,477 offers a number of improvements of the invention filed as U.S. application Ser. No. 07/808,132. The improvements provide for a more efficient use of wire rope, a lighter and more compact restraint design, an additional means of providing for bi-linear spring stiffness properties, a means for limiting the load transferred to the structure and various means which provide for ease of manufacture. These improvements are accomplished through alteration of the wire rope bight geometry and structural housing, and the addition of internal stops. The improvements each of these provide are discussed in the following paragraphs:

Wire Rope Bights—The bights of commercially available wire rope isolators used in the original invention are arranged such that they form a stable geometry when loaded in compression as shown in FIG. 2. This is accomplished by arranging the bights in opposing directions as indicated in FIG. 2. This stable arrangement of bights, however, is not required for the current invention to work since the bights are loaded in shear rather than compression and are stabilized by the structural housing of the invention. The arrangement of bights in the fashion depicted in FIG. 2 provide for inefficient use of the wire rope. This is due to the difference in load which the bights carry when the isolator is loaded in shear as shown in FIG. 2A. Some of the bights are more deformed and thus loaded heavier than the others. This inefficiency can be minimized by forming the bights 32 in a near parallel fashion from a continuous wire rope wound in a single direction as shown in FIG. 6. Furthermore, as disclosed in U.S. patent application Ser. No. 07/915,477, the inefficiency can be eliminated through the addition of a third retaining bar, forming each bight 32 from individual lengths of rope and arranging all of the bights in parallel planes as depicted in FIG. 6B. This method of employing individual lengths of rope and three retaining bars is similar to the arch isolator described in U.S. Pat. No. 4,783,038. In either case, the bights 32 are typically trapped between two retaining bars 74 and 76 as shown in FIG. 7. An alternative method of trapping the bights 32 is the use of a rectangular tube 78 filled with epoxy 80 as depicted in FIG. 7A. This latter method of trapping the bights 32 is incorporated in the design of isolators manufactured by ENIDINE of Orchard Park, N.Y. This method of trapping the bights 32 is extended by the invention to the central load carrying member of the restraint. For example, the central member may be composed of a round tube with holes provided for the wire rope to pass through. The central tube is then filled with epoxy to hold the bights in place as shown in FIG. 8. Alternatively, cast metal can be used to fill the void in lieu of epoxy. A third method of trapping the bights is to cast the bars/central rod around the formed bights.

The arrangement of parallel or near parallel bights 32 as depicted in FIG. 6B provides for bi-linear force-deflection properties without precompressing the bights. With a parallel or near parallel bight geometry, the isolator $I^1$ is more flexible in shear when initially deflected and becomes increasingly stiffer as the deflection increases as shown in FIG. 17. FIG. 17 is the test results from an isolator $I^1$ which had an arrangement of parallel bights 32 which were not precompressed. Such bi-linear properties provide for a "soft" spring to allow for pipe thermal expansion and "stiff"
spring properties to limit pipe dynamic displacements. The range of the "soft" portion of the spring can be further increased by precompressing the bights as previously disclosed in the U.S. patent application Ser. No. 07/808,132.

The efficient arrangement of the bights 32 can also provide a means of reducing the profile of the pipe restraint structural housing. This is desirable since space is sometimes limited in nuclear and process plants, which would utilize these restraints. Alternate restraining devices provide for a compact overall geometry. A means of reducing the profile of the pipe restraints is accomplished by arranging the bights in a fashion depicted in FIG. 12.

Structural Housing—U.S. patent application Ser. No. 07/808,132 utilized a rectangular shaped structural housing for retaining the bights. The arrangement of bights 32 in the fashion disclosed in U.S. patent application Ser. No. 07/915,477 and depicted in FIG. 8 more readily allows the use of a circular tube 150 for the structural housing. This is desirable since tubing of various diameters and thicknesses are readily commercially available. The use of round tubing offers an alternate means of precompressing the bights 32, a means of protecting them from damage and a means of reducing the chance of human injury when the bights are deflected during pipe movements.

A structural housing 150 composed of circular tubing also provides for a means for efficient manufacturing to accommodate varying stiffness and load capacities. By manufacturing bights 32 in standard size groups, the stiffness and load capacity of a restraint 1 may be increased by simply adding more bight groups to a longer rod and structural housing as depicted in FIG. 15. Alternatively, bight groups of three or four may be located around the central rod as depicted in FIGS. 16, and 16A respectively.

Internal Stops—The forces associated with piping hydraulic transients and seismic events are seldom accurately known. Industry designs for such forces using "nominal" design loads. While nominal design loads are chosen which are thought to envelope the maximum actual loads, occasionally the actual loads exceeds the nominal design loads. Pipe restraints are selected based on their capacity to carry a nominal design load. Exceeding this load on the restraint described in U.S. patent application Ser. No. 07/808,132 may result in plastic deformation of the wire rope bights due to excessive deflections. Such excessive deflection may also cause an overstress in the piping system. As a means of limiting such excessive deflections and still provide a safety margin in the force carrying capacity of the restraint, the displacement is limited by internal stops as disclosed in U.S. patent application Ser. No. 07/915,477. The bight retaining bars may act as stops or stops may be welded to, or an integral part of, the central rod. Alternatively, stops may be fastened to the central rod by means of shear pins. Such shear pins are sized such that they are the weak link of the various load carrying members of the restraint. Their size are also dictated by the safety factor desired in the restraint rated load. The use of shear pins offer the additional ability of absorbing a large mount of energy should they be deformed plastically. This provides additional protection to the piping system under extreme dynamic events and limits the load transmitted to the structure to the shear pin-failure load.

SUMMARY OF THE INVENTION

The current invention is an improved energy absorption and pipe displacement limiting device of simple construction, ease of inspection and minimal maintenance which is an alternate form of U.S. patent application Ser. Nos. 07/808,132 and 07/915,477. The current invention provides an additional means of limiting transient displacements and absorbing energy through the addition of a slide bearing or friction member(s). The current invention also provides for additional means of providing for pipe thermal expansion through the addition of gaps.

The invention acts as a pipe restraint for connection between a pipe subject to movement due both to dynamic loads and to thermal deformations, and an adjacent structure. The current invention is adjustable in turnbuckle-like fashion and possesses symmetric force-deflection properties in both tension and compression which resists buckling under load.

The invention arranges wire rope bights in a compact manner which may be symmetric or asymmetric to minimize the profile of the restraint. The arrangement of the bights may vary, including an efficient means of loading all bights equally. Internal stops within the restraint of the invention provide a means of protecting the bights from excessive displacements. Shear pins provide a means absorbing additional one time energy and act as the weak link of the restraints' load carrying elements. Energy absorbing slide beatings or friction members provide a variable friction force which is minimized in the thermal expansion range of the restraint and becomes increasingly larger as the restraint is displaced beyond the thermal expansion range.

The novel device of the invention includes a central rod with stops which slides telescopically within a central hollow cylinder. The central rod has stops on each end, one of which is threaded to provide for adjusting a gap size. A second hollow cylinder sliding telescopically receives one end of the central cylinder. The second hollow cylinder provides for a permanent length adjustment of the restraint.

Connected to the second cylinder, and having walls spaced from and surrounding an intermediate portion of the central cylinder for axial movement relative thereto, is an end cap. The end cap is screwed or otherwise connected to a circular tube which acts as a frame or structural housing. Connected to the other end of the tube is another end cap which surrounds an intermediate portion of the central cylinder and allows for relative axial movement.

A first base forming member is mounted on the periphery of the intermediate portion of the central cylinder. A second base forming member is located and held in place on the frame or housing wall opposite the first base forming member. An arrangement of wire energy absorbing rope bights, each having portions in a state of precompression, is fixed to the first base forming member and the second base forming member to provide a pipe movement restraint having bi-linear force-deflection properties when an adjustable gap is set to zero and trilinear force-deflection properties when the adjustable gap is not zero.

The base forming members include both bight capturing members and spacers to determine the extent of precompression of the wire energy absorbing rope bights and therefore to adjust the stiffness ranges of the bi-linear spring properties.

The bights may be formed from a continuous length of wire rope. Alternatively, the bights may be formed from individual lengths of wire rope and captured by three base forming members. In either case, the deflection of the wire rope bights are limited to the gaps provided between the wire rope base forming member(s) connected to the central cylinder and the housing end caps.

The base forming members may be composed of parallel plates which trap the wire rope bights by friction or they may be hollow tube members filled with epoxy or cast metal to secure the wire rope bights.

When the radial deflection of the central cylinder must be limited, a stiffener bar is added adjacent to the first base forming member connected to the central cylinder. Alternatively, a slide bearing may be located between the central cylinder and second base forming member to limit radial deflection of the central cylinder.

The restraint may be designed to absorb additional energy by use of a friction member in place of a slide bearing. The friction member may be provided in the asymmetric arrangement of bights described in the current patent or multiple friction members may be provided in a symmetric arrangement of bights.

An internal stop is connected by a shear pin(s) to the central cylinder. The shear pin(s) act as the weak link of the restraint's load-carrying parts and provides for an additional means of absorbing energy should the rated load of the restraint be exceeded.

Belleville disk springs located on the central rod and at each gap end act to soften the impact blow to the internal stops when either of the internal gaps suddenly close during a transient event.

The restraint is attached between a pipe and an adjacent structure and has a capability for an "in-field" turnbuckle type of restraint adjustment. This adjustment is made possible by the ends of the first and second hollow cylinders remote from the intermediate portion of the central rod having threads of opposite hands to which connecting rods with spherical eye bearings are adjustably attached by means of the threads.

The invention geometrically arranges isolators in such a fashion so as to allow one end of the invention to be connected to a pipe and the other end tube connected to a static structure. The restraint allows for thermal expansion of the pipe, and exhibits excellent damping characteristics, and has a high cycle fatigue life. The invention can carry tension and compression loads without buckling and is adjustable in turnbuckle-like fashion.

The invention utilizes a "gapped" central rod and wire rope bights in a "turnbuckle" tube with a spacer bar(s) to create a condition of precompression. This solves the conflict of design requirements by providing an adjustable pipe restraint with trilinear force-deflection properties. That is, the invention has a free travel range and "soft" spring range for thermal expansion and a "stiff" spring range for dynamic events. The bi-linear portion of the force deflection curve is produced by arranging the bights in parallel planes or near parallel planes and precompressing the bights by varying the structural housing tube diameter and by the addition of spacer bars. By altering robe diameter and/or the thickness of the spacer bars, the range of the "soft" portion of the spring is altered and by changing the radial gap setting varying degrees of pipe thermal deformation and, or, displacement are provided for.

A friction member(s) may be added to the restraint to absorb additional energy. The friction force provided by the friction member(s) is variable such that the force is minimal in the restraint's "soft" range and becomes increasingly larger in the restraints "stiff" range. Thus, the frictional force has minimal effect in restraining pipe thermal expansion and provides an additional means of controlling dynamic displacements and absorbing energy.

The response characteristics of the restraint can be designed by varying the gap, the diameter of the wire rope bights, the number of strands in the rope bight, the rope bights' length, the twist or lay of the wire rope bights, the geometry of the arrangement and the number of bights. The restraint's response characteristics can also be altered by precompressing the bights, and/or the degree of parallel of the bights, thus altering the ranges of spring stiffness. The response characteristics may be further altered by the addition of a friction member(s). The invention provides for the arrangement of gaps, isolators and optional friction members in such away that a trilinear force-deflection is produced. This is a desirable attribute which provides for both thermal deformation of the pipe and dynamic load protection.

BRIEF DESCRIPTION OF THE DRAWINGS

FIG. 4 is a schematic elevation view of the energy absorption and pipe displacement limiting device of the invention with its wire energy absorbing rope bights each having portions in a state of precompression due to base spacer bar and its sliding central rod with gaped ends and its slide bearing or energy absorbing slide fiction member.

FIG. 4A is a view taken along line 4A—4A of FIG. 4.

FIG. 4B is a view taken along line 4B—4B of FIG. 4.

FIG. 5 is a schematic elevation view of a restraint which does not employ a sliding gapped central rod assembly.

FIG. 5A is a view taken along line 5A—5A of FIG. 5.

FIG. 10 is a schematic elevation view showing an asymmetric arrangement of bights with a stiffener member assembled into the invention. FIG. 10A is a view taken along line 10A—10A of FIG. 10.

FIG. 13 is a schematic elevation view showing a symmetric arrangement of bights assembled into the invention.

FIG. 13A is a view taken along line 13A—13A of FIG. 13.

FIG. 14 is a schematic elevation view showing a symmetric arrangement of bights and sliding friction members assembled into the invention.

FIG. 14A is a view taken along line 14A—14A of FIG. 14.

DETAILED DESCRIPTION OF THE PREFERRED EMBODIMENT

Figure 4C:
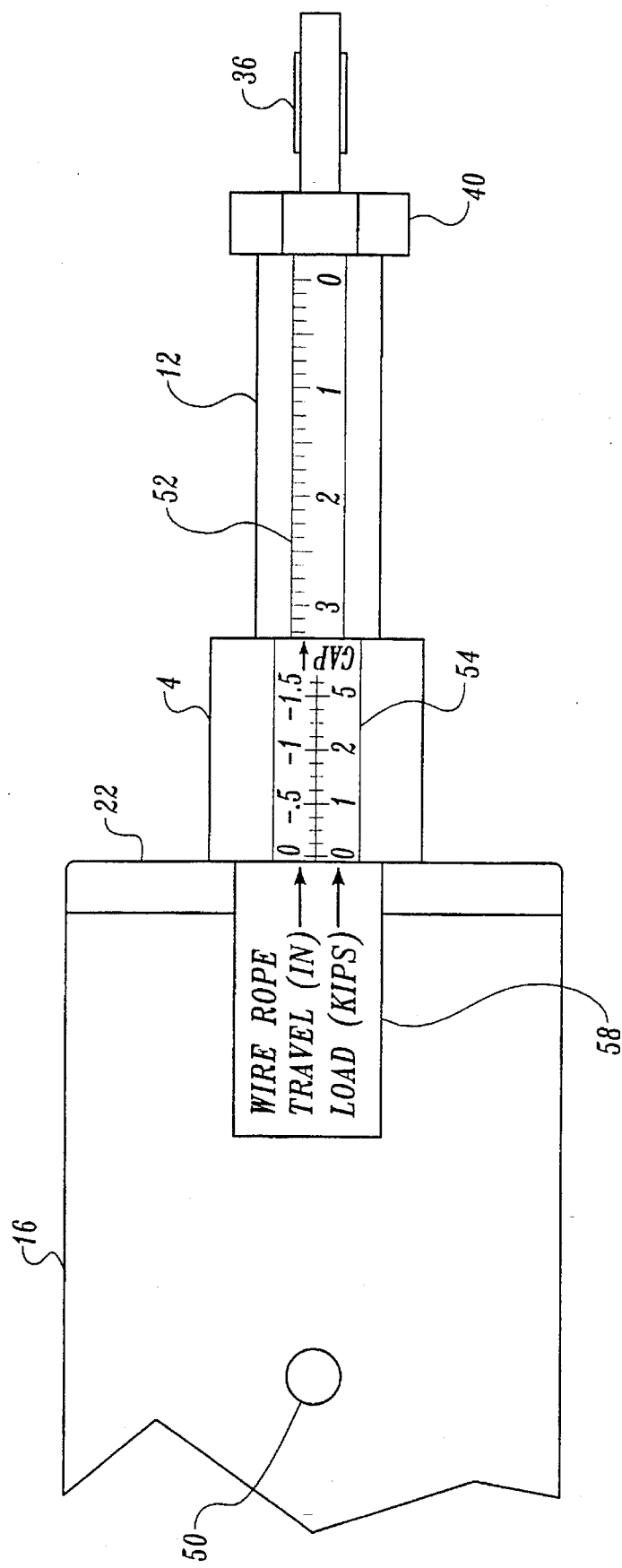
FIG. 4C is a fragmentary enlarged view of scaled viewing indicators to determine the central cylinder position and amount of load on the wire rope bights, and a scaled viewing indicator on the central rod assembly for determining the deflection of the assembly within the gaps.

The current invention provides for the same improvements as U.S. patent application Ser. No. 07/915,477 in an alternate form by means of an asymmetric arrangement of the wire rope bights 32 (FIG. 4). The current invention also offers improvements over the inventions filed as U.S. patent applications Ser. Nos. 07/808,132 and 07/915,477. The improvements provide for additional energy absorption by means of a friction member or a slide bearing 56 and provide for additional thermal expansion by means of gaps in the assembly. The asymmetric bight arrangement and improvements are discussed in the following paragraphs:

FIGS. 4–4C illustrate an energy absorption and pipe displacement limiting restraint of the invention. The numeral 1 (FIG. 4) generally designates the improved energy absorption and pipe displacement limiting restraint or pipe restraint of simple construction, ease of inspection and minimal maintenance constructed according to the principals of the invention. The restraint 1 is connected between a pipe subject to movement due to both dynamic loads and to thermal deformations at one end, and to an adjacent structure at the other end. The invention provides a means of limiting transient displacements and absorbing energy through the addition of friction members. The invention also provides means for providing for pipe thermal expansion through the use of gaps.

The restraint 1 includes a central rod 2 and a hollow cylinder 12 (FIG. 4) mounted at one end of the central rod 2. One end of the central rod 2 is mounted to the hollow cylinder 12 by threads on the interior of the hollow cylinder 12. The internal threads of the hollow cylinder 12 are located at the end of the hollow cylinder remote from the intermediate portion 152 of the central rod 2.

The end of the central rod 2 opposite the hollow cylinder 12 is received internally within two Belleville disk springs 38 (FIG. 4) and a hollow stop cylinder 8 (FIGS. 4 and 4A) in a slidingly telescopical relationship. The Belleville disk springs 38 transfer the load from the central rod 2 to the hollow cylinder 8 and act to soften the impact blow to the internal stops when the gap suddenly closes. The end of the central rod 2 opposite the hollow cylinder 12 is threaded for connection to an internally threaded ring 10. The ring 10 is locked to the end of the central rod 2 by a pin 42 at one end. The opposite end of the central rod 2 is received within the internally threaded hollow cylinder 12. The end of the central rod 2 is locked in place in the hollow cylinder 12 by a set screw 14 which bears against a flat 46 on the central rod 2 to prevent unthreading once the gaps. Access to the set screw 14 is gained by means of a hole 50 (FIG. 4C) provided in the housing 16.

The restraint 1 also includes a hollow cylinder 6 connected to a tube or housing 16 (FIGS. 4 and 4C) having a side wall 18 spaced outwardly from and surrounding the intermediate portion 158 of a central cylinder 4. The tube or housing 16 has two end caps 20 and 22, each end cap 20 and 22 including a bushing or opening 24 (FIG. 4) to allow the housing 16 to slide without binding axially, on and relative, to central cylinder 4. Each end cap 20 and 22 is screwed or otherwise connected to the housing 16. A second hollow cylinder 6 is connected to the end cap 20 and thus housing 16 opposite the end of the housing surrounding the hollow cylinder 12.

The central rod 2 is received by the two Belleville disk springs 38 and by stop hollow cylinder 8 in a telescoping relationship. The rod assembly, including central rod 2, hollow cylinder 8, ring 10, hollow cylinder 12, and disk springs 38, is received within the housing 16 in a sliding telescoping relationship. Stop hollow cylinder 8 is mounted to the central cylinder 4 (FIGS. 4 and 4A) by means of a shear pin 44 (FIG. 4A) that extends through the central cylinder 4 and into the stop cylinder 8. The shear pin 44 is sized such that it is the weak link of the load caring members. The shear pin 44 provides a safety factor to allow failure of the restraint 1. The shear pin 44 also provides an additional means of absorbing energy and limiting the load on the building structure should a failure load be imposed on the restraint 1.

Figure 17:
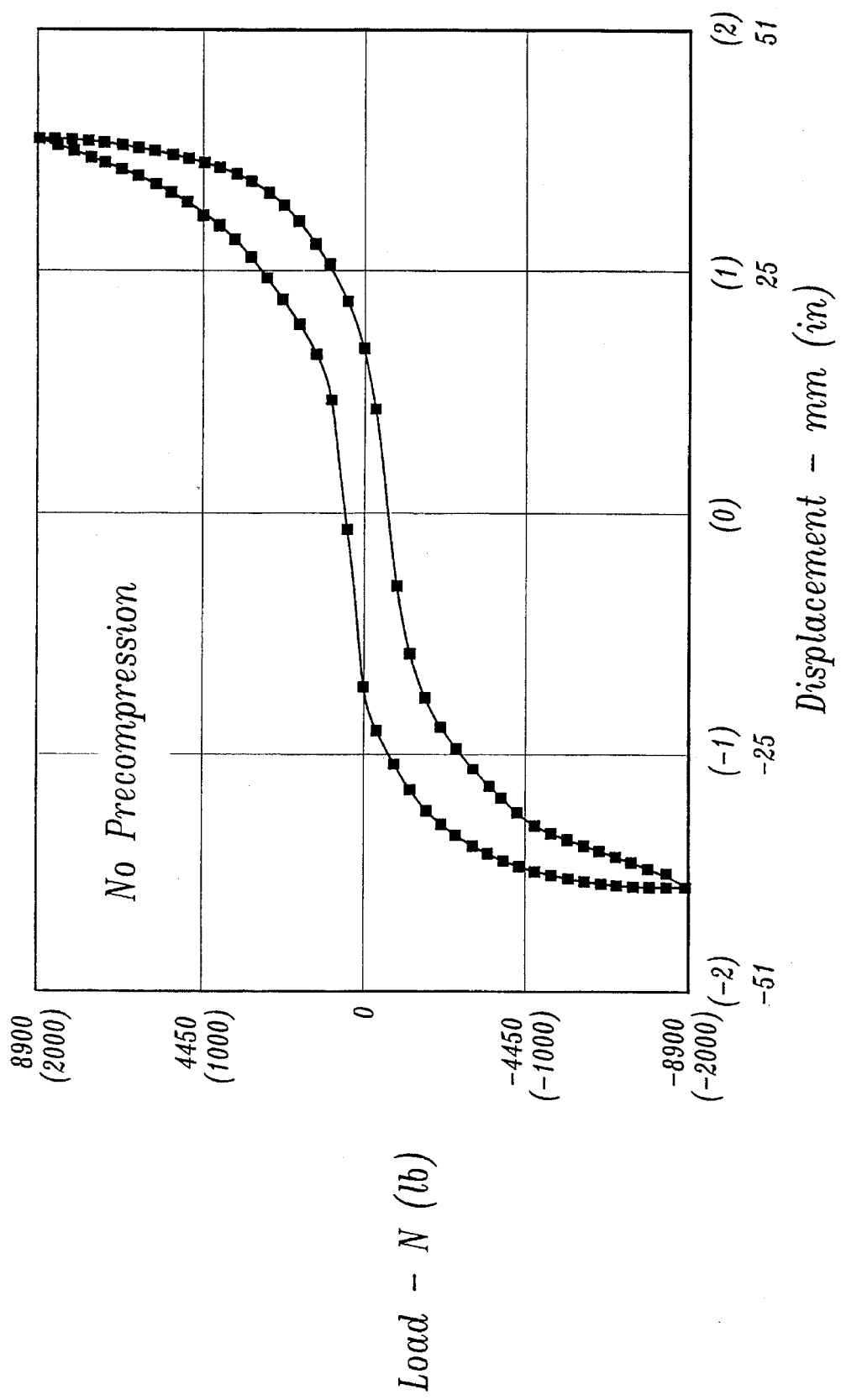
FIG. 17 is a graph illustration of the bi-linear spring characteristics of a typical device with parallel bights as shown in FIG. 4 and 4A with no recompression of the bights.

An isolator with bights 32 generally designated $I^1$ (FIG. 4) is mounted in the housing 16 and includes, respectively, a first base forming member 26 (FIGS. 4 and 4A) located on the periphery of the intermediate portion 158 of central cylinder 4 and a second base forming member 28 located on the wall 18 of the housing 16 opposite the side of the central cylinder 4 on which the first base forming member 26 is located. The second base forming member 28 is held in position on the wall 18 by end plates 60 and 62 (FIGS. 4 and 4B) which are fastened to the interior of housing 16 by fasteners 160. As best seen in FIG. 4A, the base forming members 26, and 28, are positioned in a spaced relation to each other in accordance with and at a distance dependent on another base forming member or spacer 30 (FIG. 4A) located between the second base forming member 28 and the housing 16. The thicknesses of the spacer 30 helps determine how much precompression the energy absorbing rope bights 32 are subjected to during use. The magnitude of the precompression of the rope bights 32 determines the spring characteristics as shown in FIG. 17. The gaps 156 and 154 between the base forming member 26 and end caps 20 and 22 are dictated by the maximum travel which the isolator $I^1$ is permitted to travel (FIG. 4).

An arrangement of energy absorbing wire rope bights 32, each having portions in the state of compression, is fixed to the first base forming member 26 and the second base forming member 28. The rope bights 32 provide restraint 1 with bi-linear force deflection properties when the adjustable gap is set to zero and trilinear forced deflection properties when the adjustable gap is not set to zero.

Each base forming member 26 and 28 includes bight capturing members composed of either parallel plates 74 and 76 (FIG. 7) that trap the bights 32 by friction or hollow tube members 78 (FIG. 7A) filled with epoxy or cast metal that secures the bights 32 within the hollow tube. The bights 32 may be formed from a continuous length of wire rope or alternatively, they may be formed from individual lengths of wire rope captured by the first and second base forming members 26 and 28. In either case, the deflection of the bights 32 are limited by the gaps 154 and 156 provided between the first and second base forming members 26 and 28 and the end caps 20 and 22.

A self lubricating slide bearing 56 (FIGS. 4–4B) is located between the second base forming member 28 and the central cylinder 4. The slide bearing 56 limits the radial deflections and stresses in the central cylinder 4 during operation of the restraint 1. Alternatively, the slide bearing 56 may act as a friction member by not using a lubricated surface. Such a sliding friction bearing 56 provides a means of altering the force-deflection properties of the restraint 1 and absorbing additional energy during operation of the restraint.

Two connecting rods 34 and 36 are threaded into the ends of the first and second hollow cylinders 6 and 12, respectively. The connecting rods 34 and 36 have mating opposite handed threads for engagement with the ends of the hollow cylinders 6 and 12, respectively, remote from the intermediate portion 152 of central rod 2. The connecting rods 34 and 36 include spherical eye bearings that are adjustable by means of threads in a turnbuckle manner. A jam nut 40 is located near the end of each hollow cylinder 6 and 12 to prevent the connecting rods 34 and 36 from unthreading.

A key 48 (FIG. 4) is mounted to the interior surface of the central cylinder 4 and is received by a keyway (not shown) machined into the ring 10. The key 48 prevents rotation of the central rod 2 relative to the central cylinder 4 when setting the gap or adjusting the length of the restraint 1 in a turnbuckle manner.

One of the connecting rods 34 or 36 is to be connected to a pipe harness (not shown), for example, and the other connecting rod is to be connected to an adjacent structure (not shown) which may be a static structure such as a part of a building or an adjacent piece of process equipment. The restraint 1 is adjustable in a turnbuckle-like fashion and possesses symmetric force deflection properties in both tension and compression which resists buckling under load.

A flat machined at one end of cylinder 12 is marked with a viewing scale 52 (FIG. 4C) which indicates the position of the central rod 2 relative to the central cylinder 4. The central cylinder 4 also has a flat machined on one end and is marked with a viewing scale 54 (FIG. 4C) and a nameplate 56 to indicate the deflection and load of the wire rope bights 32. Holes (not shown) may also be provided in hollow cylinders 6 and 12 to determine the minimum thread engagement of the connecting rods 34 and 36, with the hollow cylinders 6 and 12, respectively.

Figure 1:
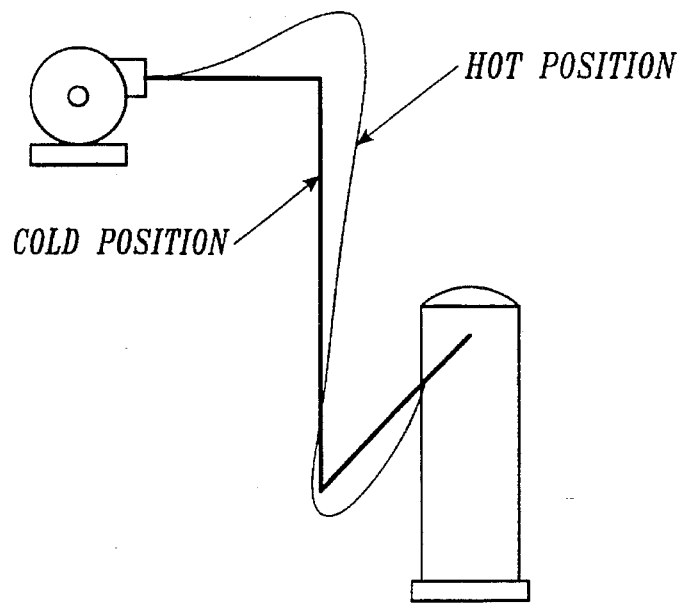
FIG. 1 is a schematic elevational view of a pipe connected between process equipment, a pump and a tank, showing the effect of temperature change on the pipe, with both a cold position of the pipe and a hot position of the pipe due to thermal growth induced by a hot fluid in the pipe illustrated.
Figure 1A:
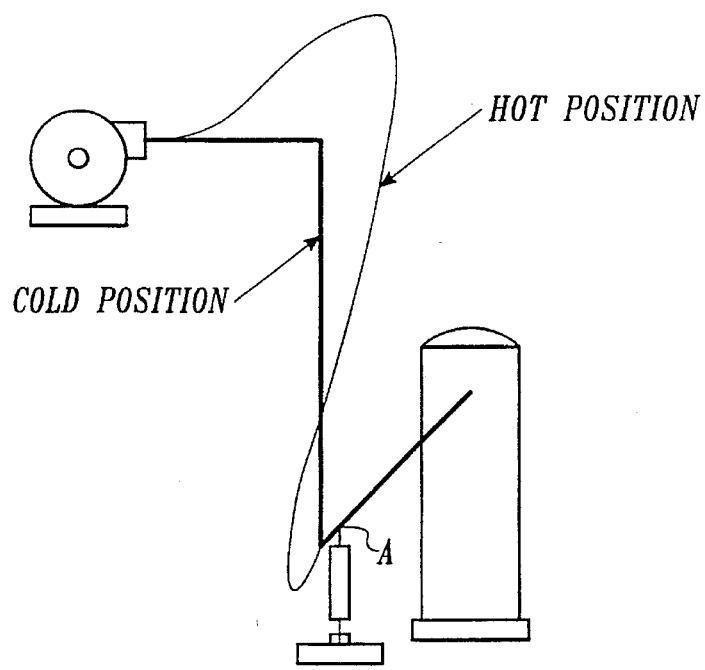
FIG. 1A is a view similar to FIG. 1 with a rigid pipe restraint fastened at point "A" such that the pipe does not expand as in FIG. 1 and may result in an over-stressed condition in the pipe or an unacceptable load on the process equipment.
Figure 2:
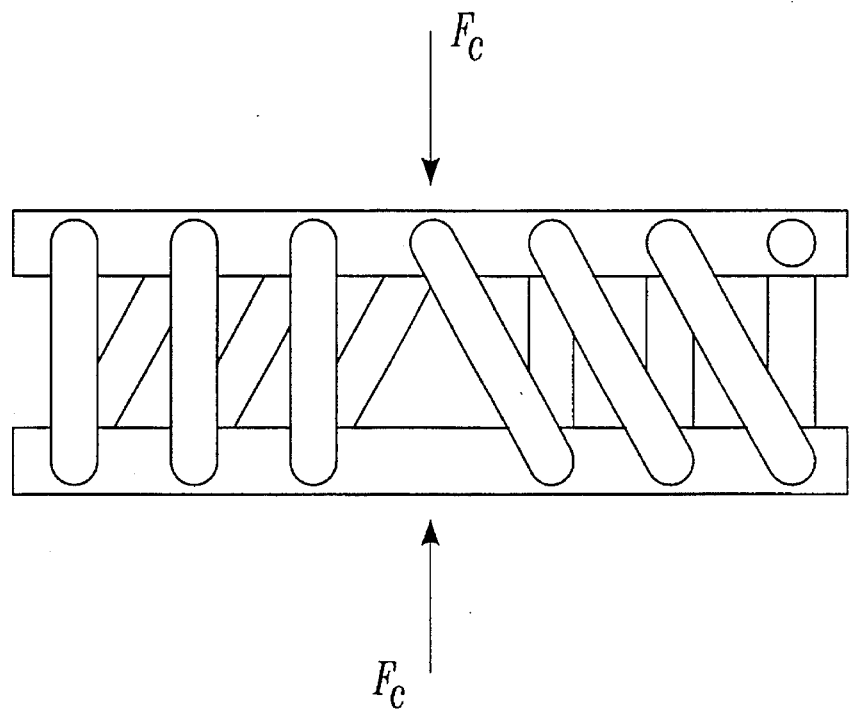
FIG. 2 is a schematic elevation view of a commercially available isolator subjected to compressive loading.
Figure 2A:
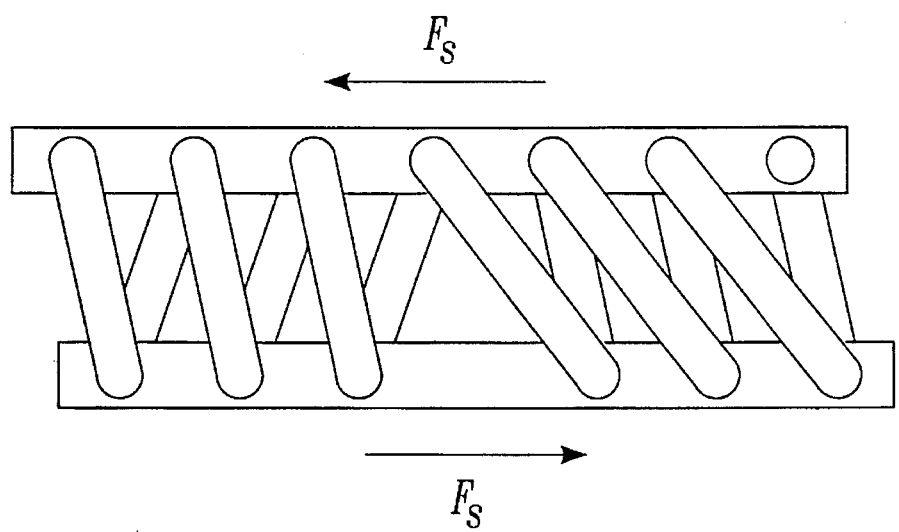
FIG. 2A is a schematic elevation view of a commercially available isolator subjected to shear loading.
Figure 3:
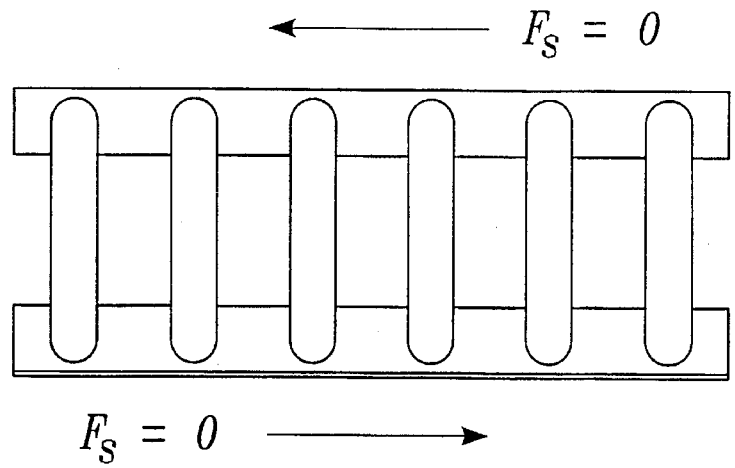
FIG. 3 is a schematic elevation view of an isolator in an unloaded condition.
Figure 3A:
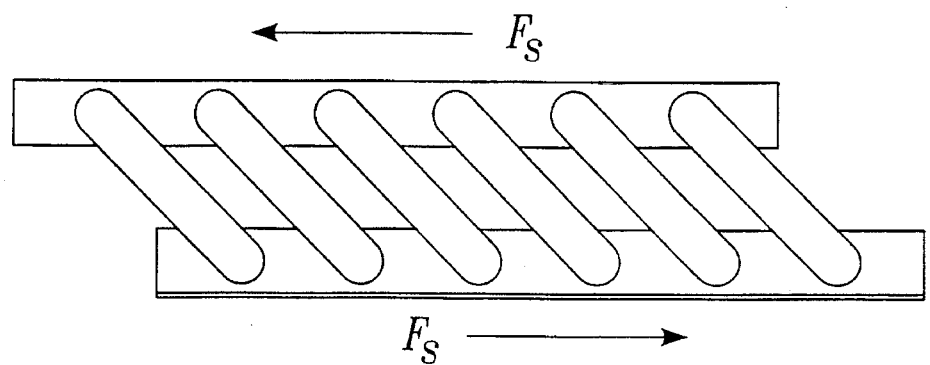
FIG. 3A is a schematic elevation view of an isolator deflected in the shear and normal directions due to shear loading.
Figure 3B:
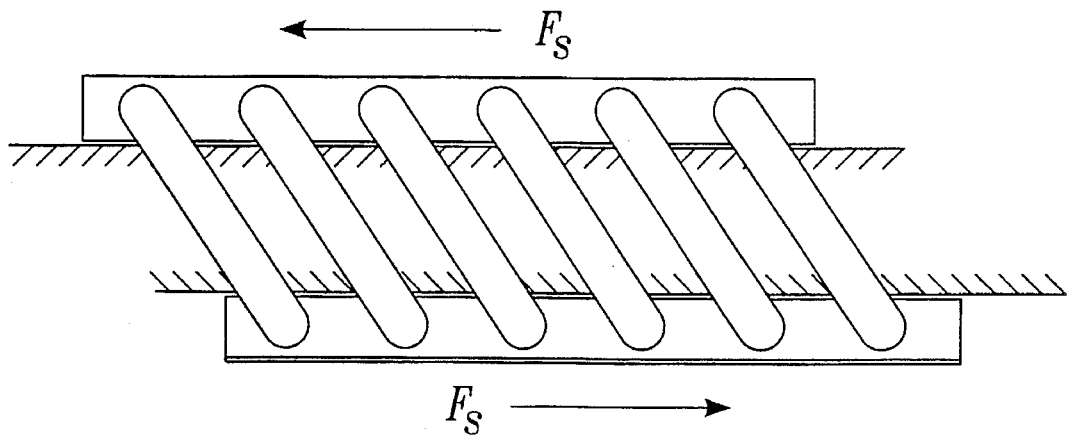
FIG. 3B is a schematic elevation view of the deflection of an isolator which is restrained in the normal direction and loaded in shear.

The invention provides a method of arranging the bights 32 in an asymmetric fashion around the central rod 2 as best seen in FIGS. 4 and 4A. The asymmetric bight geometry results in bending loads being introduced on the central rod 2 and structural housing 16 during operation of the restraint 1. The bending loads are due to the structural housing 16 and central rod 2 restraining the bights 32 in the direction normal to the central rod 2. If left unrestrained, as the bights 32 are deflected in shear, they would also deflect in the normal direction as depicted in FIG. 3A. By restraining the bights 32 in the normal direction as depicted in FIG. 3B, a force normal to the shear direction is developed as the bights are deflected in shear. In an asymmetric bight arrangement, this normal force produces bending in the central rod 2 and structural housing 16. This bending force is proportional to the bight 32 stiffness in the normal direction and increases as the bights are deflected and sheared.

Depending on bight stiffness in the normal direction, the bending load may cause a large bending stress and deflection to develop in the central rod 2 when the restraint 1 is loaded. The stress and deflection can be minimized by the addition of a stiffening member 82 to the first base forming member 26 as depicted in FIGS. 10 and 10A.

Restraints 1 which have a relatively large number of bights 32 or provide for large pipe thermal movements have a relatively long structural housing 16 and central rod 2. In such restraints, it may be impractical to attach a stiffening member 82 to the first base forming member 26. In such restraints, a slide bearing 56 (FIGS. 4-4B) added to the restraint 1 minimizes the bending load in the central rod 4 and structural housing 16. The slide bearing 56 fills the gap 170 between the central rod 4 and the second base forming member 28, as shown in FIG. 4A.

In order for the slide bearing 56 to be effective, the assembly of bights 32 are not fastened directly to the structural housing 16. Instead, the base forming members 26 and 28 retain the position of the bights 32 relative to the structure housing as shown in FIG. 4. As the restraint 1 is loaded, the slide bearing 56 provides an internal force equilibrium in the normal direction which minimizes the bending load. Slide beatings 56 having various permanent lubricants which minimize frictional load are readily commercially available.

Additional energy may be dissipated in the current invention if the slide bearing 56 is not lubricated. In this case, the slide bearing 56 becomes a friction member. The addition of a friction member results in force deflection characteristics which differ from previously patented friction-type energy absorbers. In friction-type energy absorbers such as described in U.S. Pat. Nos. 4,955,467 and 4,901,829, the friction force is constant throughout the stroke of the restraint. In the current invention, the friction force is dependent on the amount of the restraint 1 deflection.

Properly selecting the restraint housing 16 diameter and spacer thickness 30 results in a small gap 170 (FIG. 4A) between the slide bearing 56 and the central rod 4. In this case, in the central portion of the restraint stroke, the friction force will equal zero. As the restraint 1 is displaced from the central stroke position to the intermediate stroke position, the gap 170 closes and a relatively small but increasing friction force is present between the slide beating 56 and the central cylinder 4. This friction force is additive to the restoring shear force provided by the deflected bights 32. As the restraint displacement increases beyond the intermediate stroke position to the end stroke position, the friction force becomes significantly larger due to the increasingly larger restoring force of the bights 32 in the normal direction.

The variable friction force provided by the invention is desirable since the force is relatively small when the restraint 1 is stroked in the central/intermediate positions and thus has little effect on limiting thermal expansion of a pipe attached to one end of the restraint 1. As the pipe displacement increases due to a transient load such as a seismic event or hydraulic transient, the friction load between the slide beating 56 and central cylinder 4 become significant and combines with the restoring force of the bights 32 to arrest the pipe displacement.

As the restraint 1 is cycled, energy is dissipated by the hysteresis of the cyclic friction force provided by the slide bearing 56. This energy dissipation is in addition to that provided by deflection of the bights 32.

The restraint 1 provides for pipe thermal expansion by means of the bi-linear stiffness properties of near parallel or parallel bights 32 as disclosed in U.S. patent application Ser. No. 07/915,477. The "soft" portion of the bi-linear curve can be further increased to allow for additional pipe thermal expansion by precompressing the bights 32 as disclosed in U.S. patent application Ser. No. 07/808,132. The current invention provides for a third method of allowing for pipe thermal expansion by means of gaps. Such gaps are provided by replacement of the central rod with tube and telescoping rod assembly as shown in FIG. 4. The amount of pipe thermal expansion allowed by the gaps is a simple function of the gap size. Similar gaps could also be provided in restraints having symmetric bight arrangements.

Unlike conventional "gapped" restraints, the incorporation of gaps into the current invention, does not result in large impact loads being imparted to the pipe and the supporting structure connected to the opposite ends of the restraint 1. This is due to the deceleration and energy absorption provided by the wire rope bights 32 after either gap closes at either end. The Belleville disk springs 38 incorporated into the restraint 1 also minimize the impact load between internal parts of the restraint should the gaps suddenly close. In the restraint illustrated in FIGS. 4-4C, the size of the gaps may be changed by changing the position of the threaded stop at one end of the restraint 1.

The present invention utilizes a "gapped" central rod 2 and wire rope bights 32 in a "turnbuckle" robe with a spacer bar 30 to create a condition of precompression. This solves the conflict of design requirements by providing an adjustable pipe restraint 1 with trilinear force deflection properties. That is, the invention has a free travel range and "soft" spring range for thermal expansion and a "stiff" spring range for dynamic events. The bi-linear portion of the force deflection curve is produced by arranging the bights 32 in parallel planes or near parallel planes and precompressing the bights by varying the structural housing 16 robe diameter and by the addition of a spacer 30. By altering the diameter and/or thickness of the spacer 30, the range of the "soft" portion of the spring is altered and by changing the radial gap setting varying degrees of pipe thermal deformation and/or displacement are provided for.

Various alternate configurations of the invention are possible. FIGS. 4 through 16 show various forms of the invention and its components. Referring to FIG. 4, the central rod assembly including central rod 2, hollow cylinder 8, ting 10, hollow cylinder 12 and disk springs 38 may be eliminated for cases where the bi-linear stiffness properties of the isolator $I^1$ have a sufficient flexible range to provide for the pipe thermal expansion range. In the alternate configuration illustrated in FIG. 5, a central cylinder 4 receives the rod end 36. A pair of disks 64 and 66 are mounted on the exterior of the central cylinder 4 by means of two shear pins 68 and 70 respectively. The gaps 180 and 182 between disk 64 and end cap 20 and disk 66 and end cap 22 respectively are dictated by the maximum travel isolator $I^1$ is permitted to travel within the housing 16. The shear pins 68 and 70 also provide an additional means of absorbing one time energy and limit the load on the building structure should the failure load be imposed on the restraint.

The slide bearing 56 added to the alternate restraint 1 as shown in FIG. 5 minimizes the bending load in the central rod 4 and housing 16. In this arrangement, the slide bearing 56 fills the void between the central rod 4 and the second base forming member 28 adjacent to the structural housing 16 as shown in FIG. 5A. In order for the slide bearing 56 to be effective, the assembly of bights 32 are not fastened directly to the structural housing 16. Instead, the first base forming member 26 is used to retain the position of the bights 32 relative to the structural housing 16 as shown in FIG. 5. As the restraint 1 is loaded, the bending load is minimized due to the internal force equilibrium in the normal direction provided by the slide beating 56. Slide bearings having various permanent lubricants which minimize frictional loads are readily commercially available.

Figures 6, 6A:
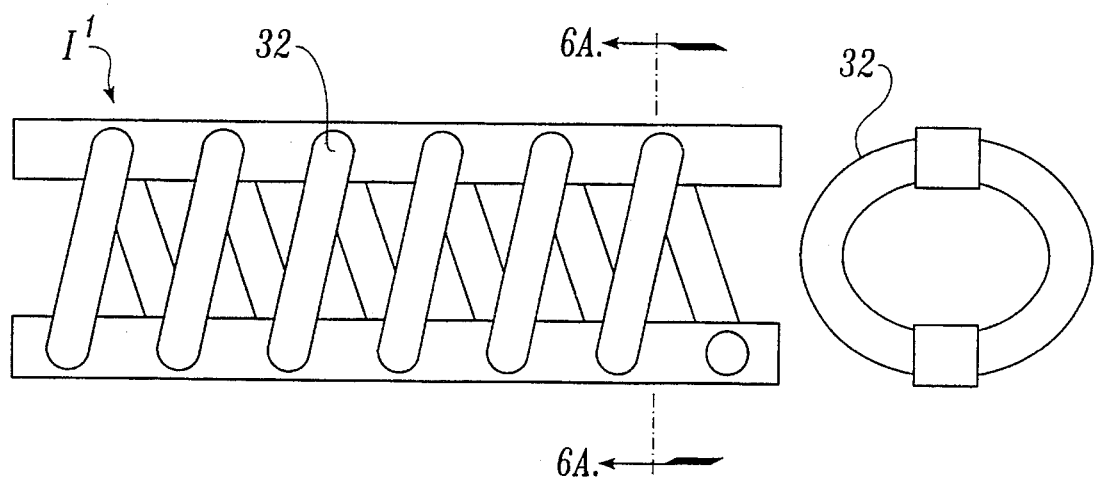
FIG. 6 is a schematic elevation view of an isolator with near parallel bights formed from a continuous length of wire rope.
FIG. 6A is a view taken along line 6A—6A of FIG. 6.
Figures 6B, 6C:
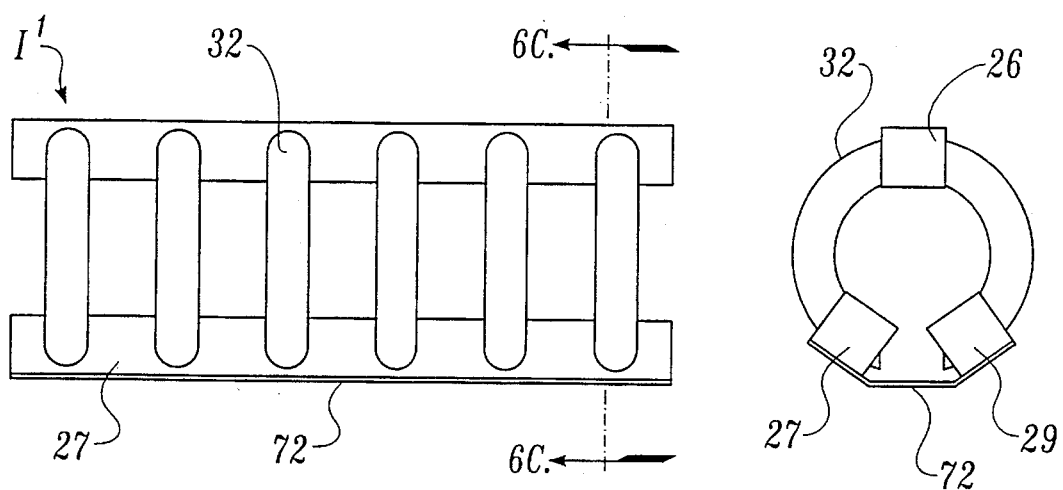
FIG. 6B is a schematic elevation view of an isolator with parallel bights formed from individual lengths of wire rope.
FIG. 6C is a view taken along line 6C—6C of FIG. 6B.

Referring to FIG. 6, the efficiency of the isolator $I^1$ is increased when each bight 32 carries a near equal load. Forming the bights 32 from a continuous wire rope wound in a single direction as compared to opposing directions increases the efficiency of the isolator $I^1$. Referring to FIG. 6B, inefficiency in the isolator $I^1$ is eliminated when bights 32 are parallel and thus equally loaded. In the embodiment shown in FIG. 6C, bights 32 are formed from individual lengths of wire rope which are trapped between three base forming members 26, 27 and 29. Base forming members 27 and 29 are held together by a retention member 72.

Figure 7:
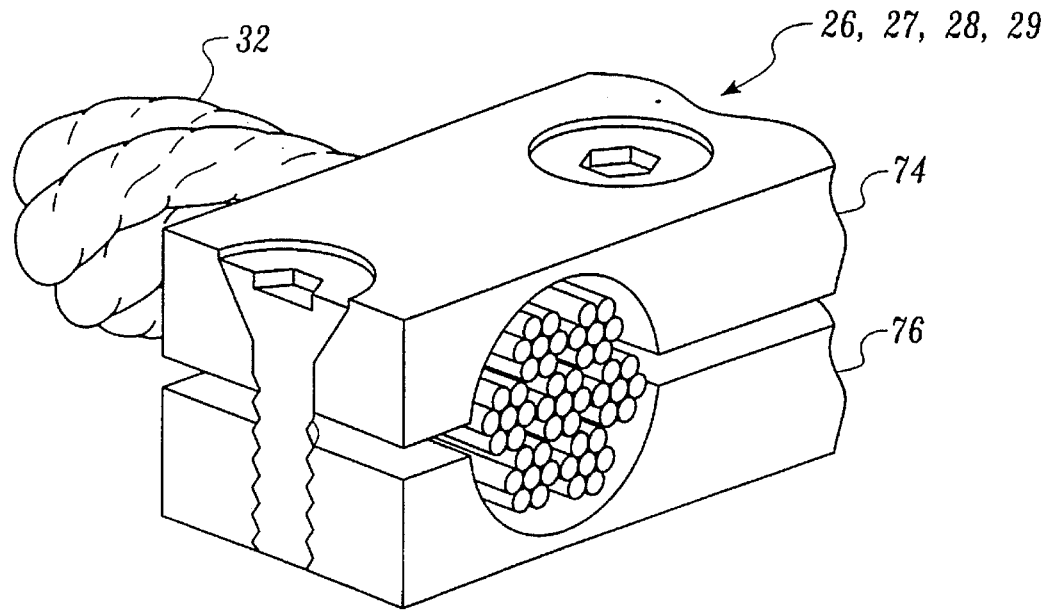
FIG. 7 is a schematic isometric view depicting a clamping method of trapping wire rope bights.
Figure 7A:
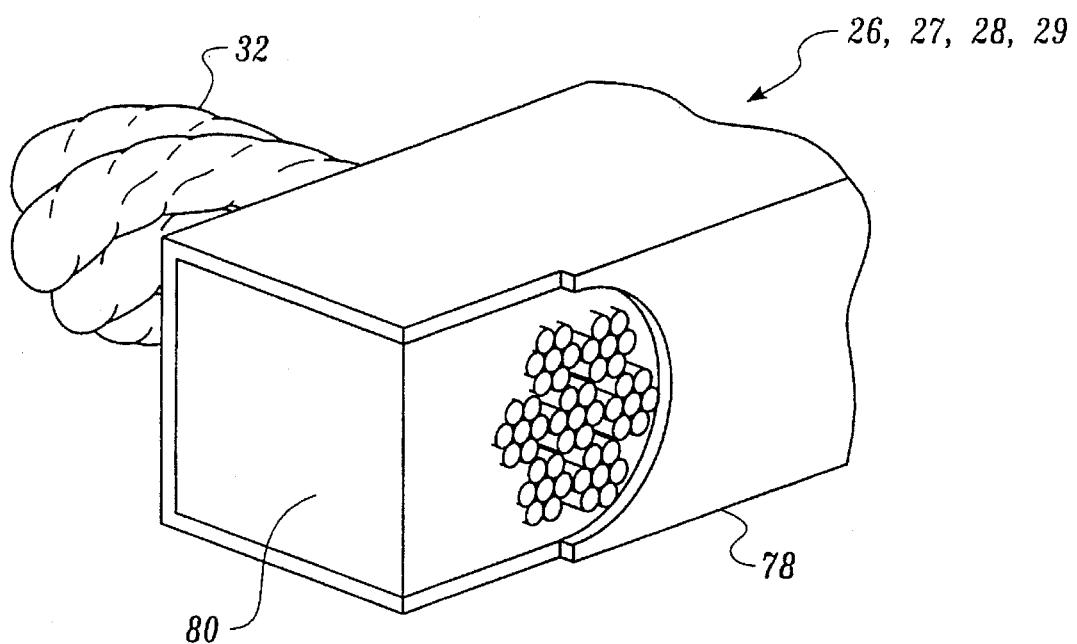
FIG. 7A is a schematic isometric view depicting an epoxy or cast metal method of trapping wire rope bights.
Figure 8:
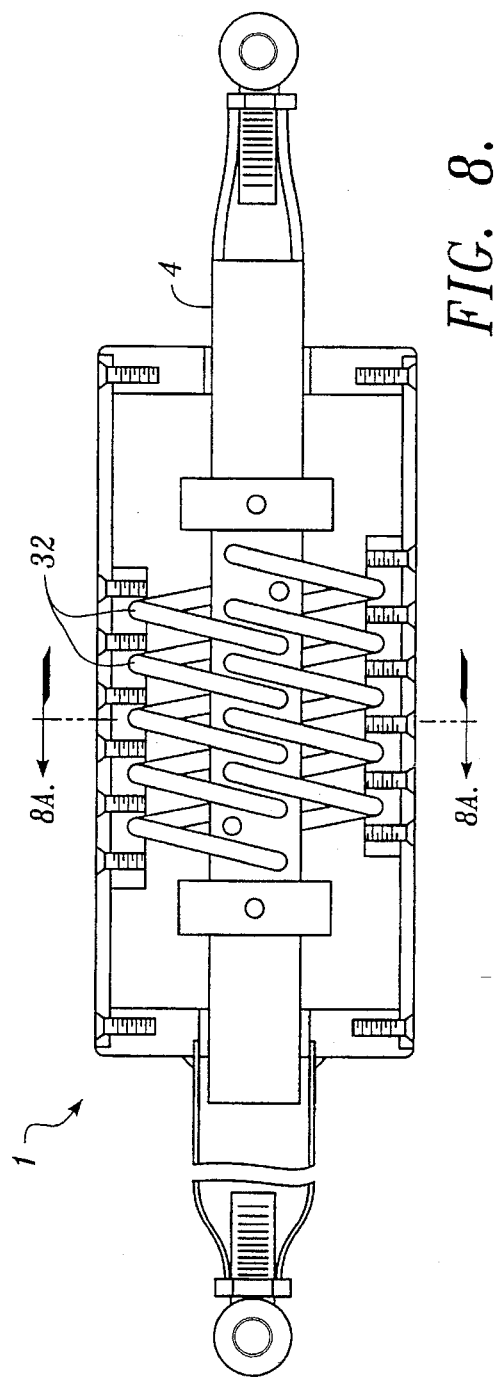
FIG. 8 is a schematic elevation view of a restraint which traps wire rope bights in a central tube filled with epoxy or cast metal.
Figure 8A:
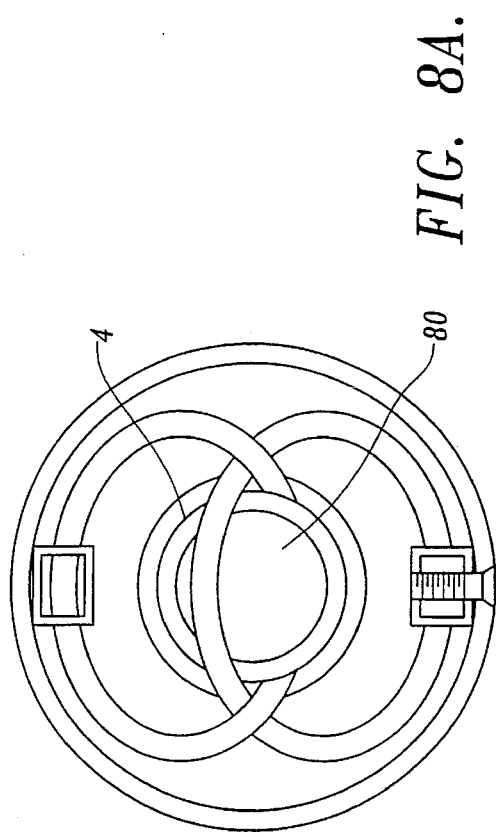
FIG. 8A is a view taken along line 8A—8A of FIG. 8.

Referring to FIG. 7, the base forming members 26, 27, 28, and 29 trap the wire rope bights 32 by friction clamping forces between two plates 74 and 76. Alternatively, base members 26, 27, 28 and 29 trap the wire rope bights 32 by filling tube 78 with epoxy or cast metal 80. Referring to FIG. 8, this same principal applied by passing the wire rope bights 32 through the central cylinder 4 and trapping the bights 32 within the central cylinder 4 by filling the interior of the central cylinder with epoxy or cast metal 80.

Figure 9:
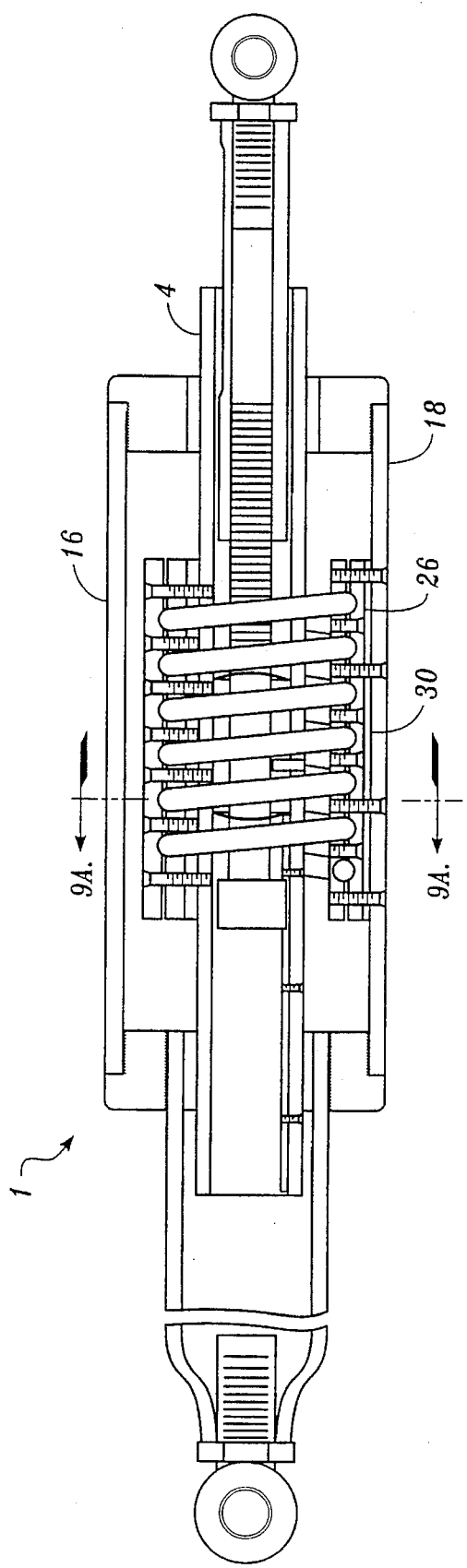
FIG. 9 is a schematic elevation view showing an asymmetric arrangement of bights assembled into the invention without a slide bearing to limit radial deflection of the central cylinder.
Figure 9A:
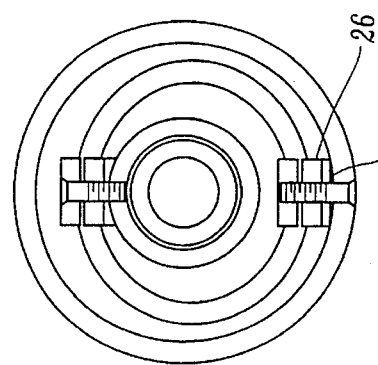
FIG. 9A is a view taken along line 9A—9A of FIG. 9.

Referring to FIGS. 9 and 9A, a slide beating is not required if the central cylinder 4 has sufficient section properties to limit its radial deflections and bending stresses. In this case, base forming member 26 and spacer 30 are fastened directly to the wall 18 of the housing 16.

Referring to FIGS. 10 and 10A, a slide bearing is not required if a stiffener 82 is added to the base forming member 26, and the combined section properties of the central cylinder 4, base forming member 26 and stiffener 82 have sufficient combined section properties to limit the radial deflection and bending stress in the central cylinder 4.

Figure 11:
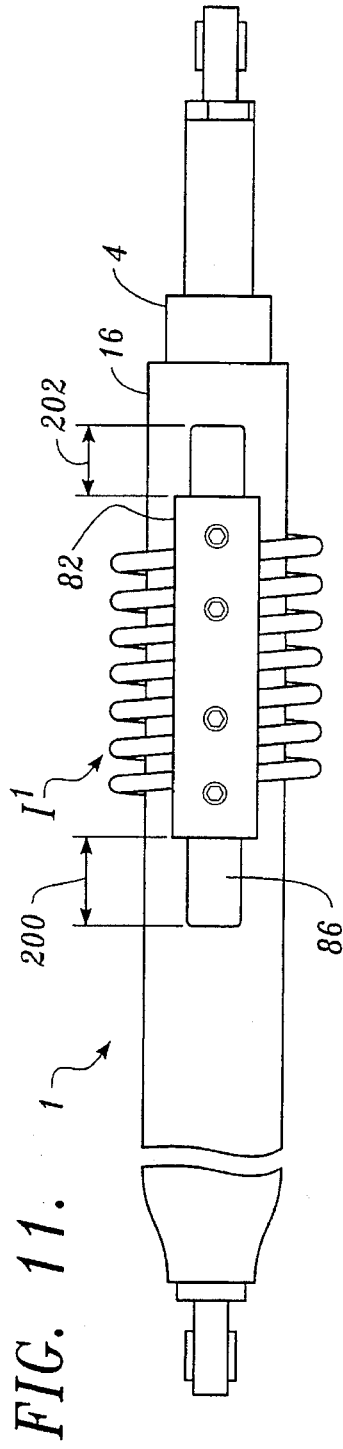
FIG. 11 is a schematic plan view showing an asymmetric arrangements of bights assembled into the invention where the bights are external to the load carrying members for ease of visual inspection.
Figure 11A:
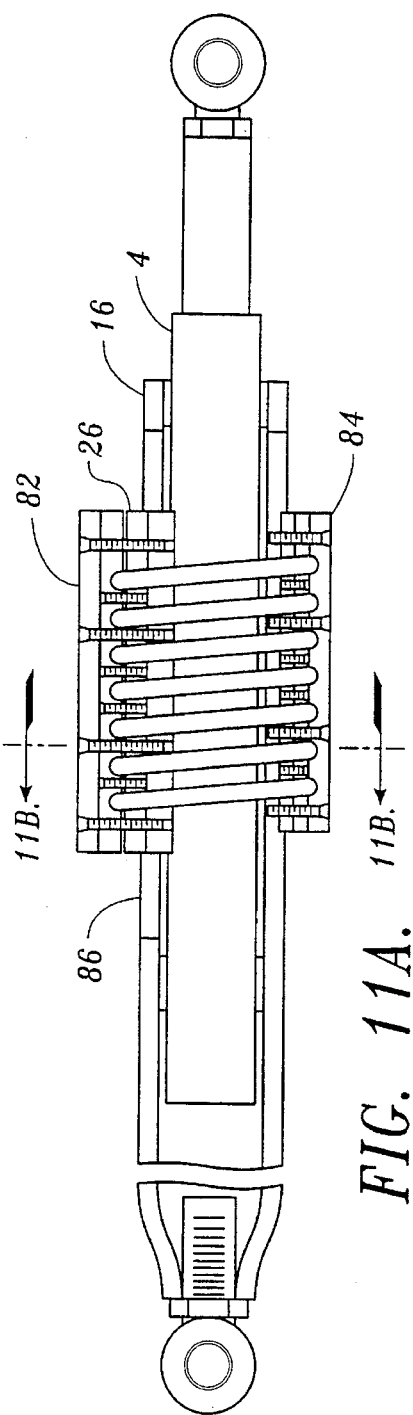
FIG. 11A is a schematic elevation view of FIG. 11.
Figure 11B:
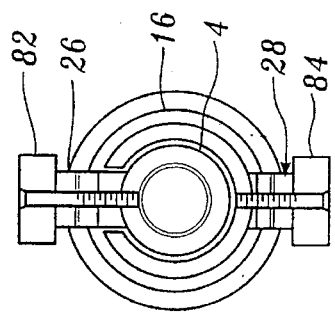
FIG. 11B is a view taken along line 11B—11B of FIG. 11.

Referring to FIG. 11, the isolator $I^1$ may be external to the structural housing 16 in situations where the bights 32 must be inspectable without disassembly of the restraint 1. The asymmetric bight arrangement used in the current invention allows the bights 32 to be located external to the housing 16. This configuration allows the bights 32 to be visually inspected without disassembling the load carrying parts of the restraint 1. In this embodiment, a slot 86 (FIGS. 11 and 11A) is provided in the housing 16 to allow the base forming member 26 to pass through and be fastened to the central cylinder 16. The length of the slot 86 is dictated by the maximum allowed travel of the bights 32 and is provided by the gaps 200 and 202 between the ends of the base forming member 26 and the ends of the slot 86. Stiffeners 82 and 84 may be added to the base forming members 26 and 28 to limit the radial deflections and bending stresses on the central cylinder 4 and structural housing 16.

Figure 12:
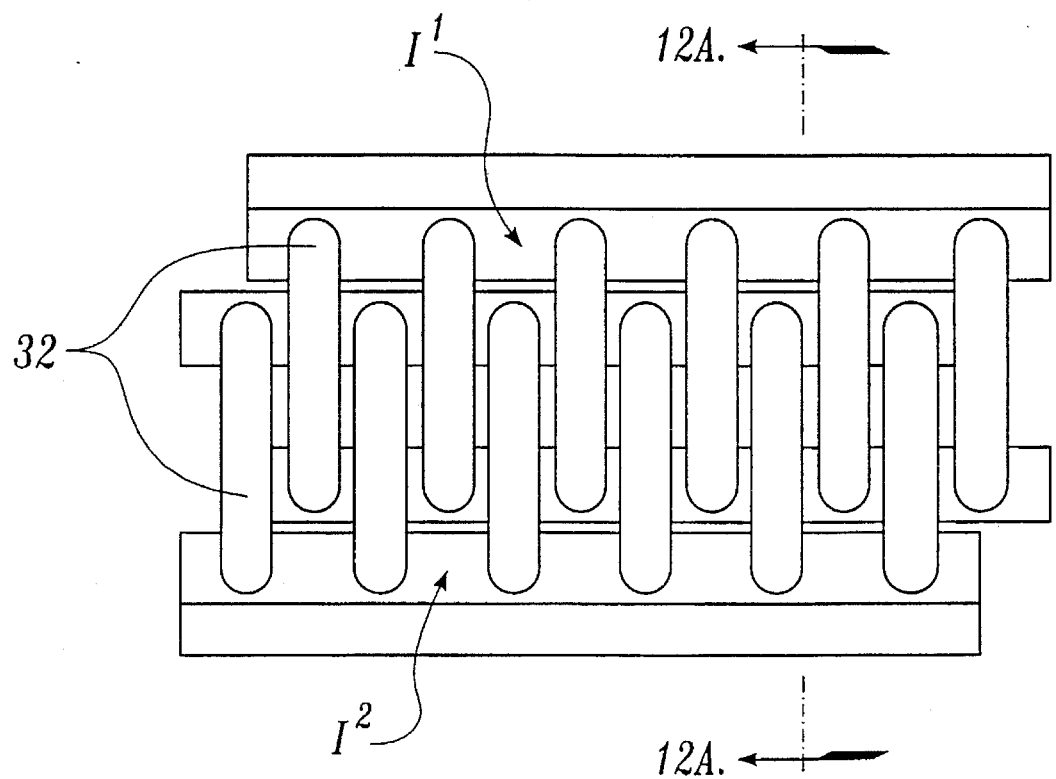
FIG. 12 is a schematic elevation view depicting two isolators combined.
Figure 12A:
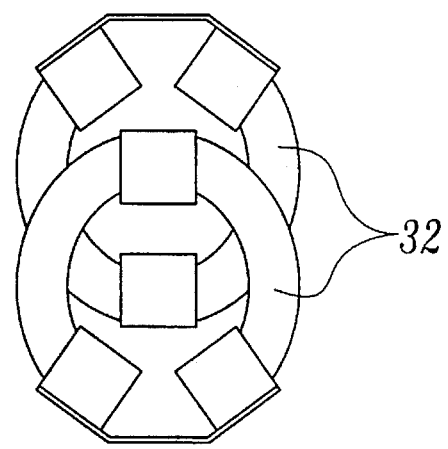
FIG. 12A is a view taken along line 12A—12A of FIG. 12.
Figure 15:
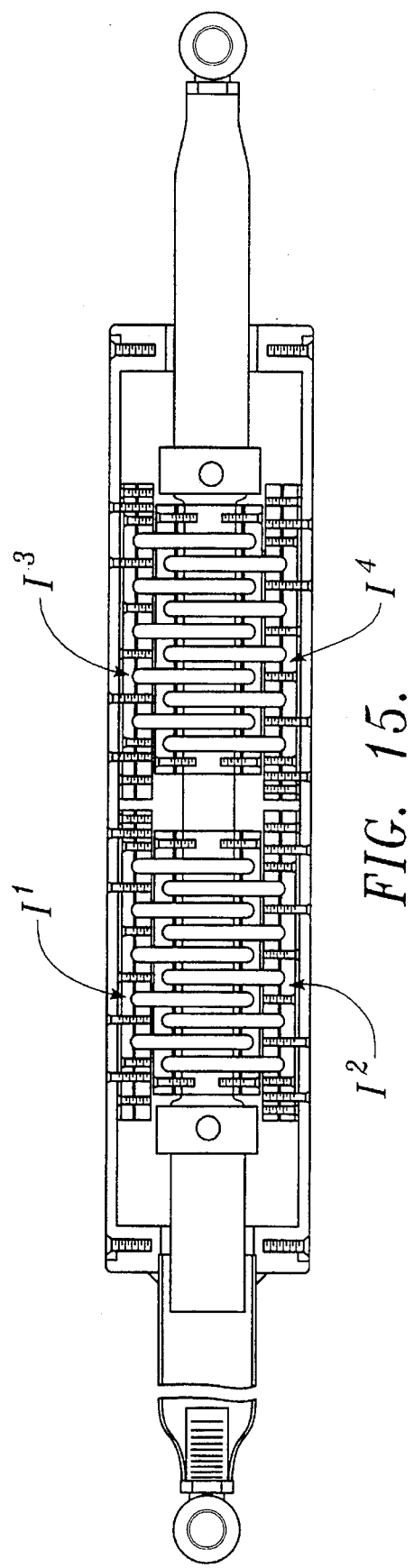
FIG. 15 is a schematic view showing multiple isolators assembled into the restraint.

Referring to FIG. 12, two parallel bight isolators $I^1$ and $I^2$ may be arranged so that their bights 32 overlap. This symmetric arrangement eliminates bending in the central cylinder and provides for a compact restraint geometry as shown in FIG. 13.

The use of two of more isolators $I^1$ does not preclude the use of a friction member(s) For example, referring to FIG. 14, friction members 88 and 90 are incorporated into a design which utilizes two isolators $I^1$ and $I^2$.

Figure 16:
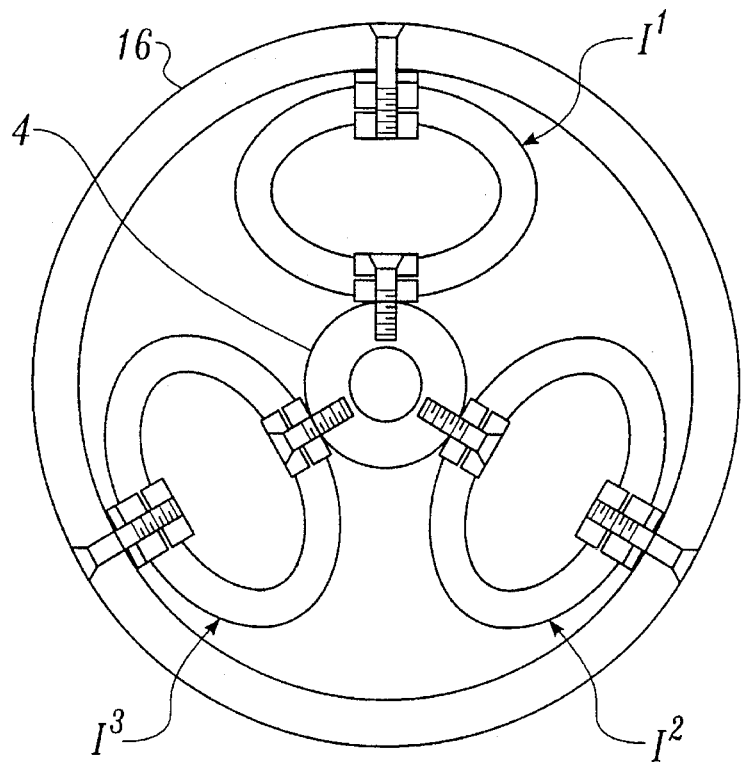
FIG. 16 is a schematic end view showing three isolators assembled into the restraint.
Figure 16A:
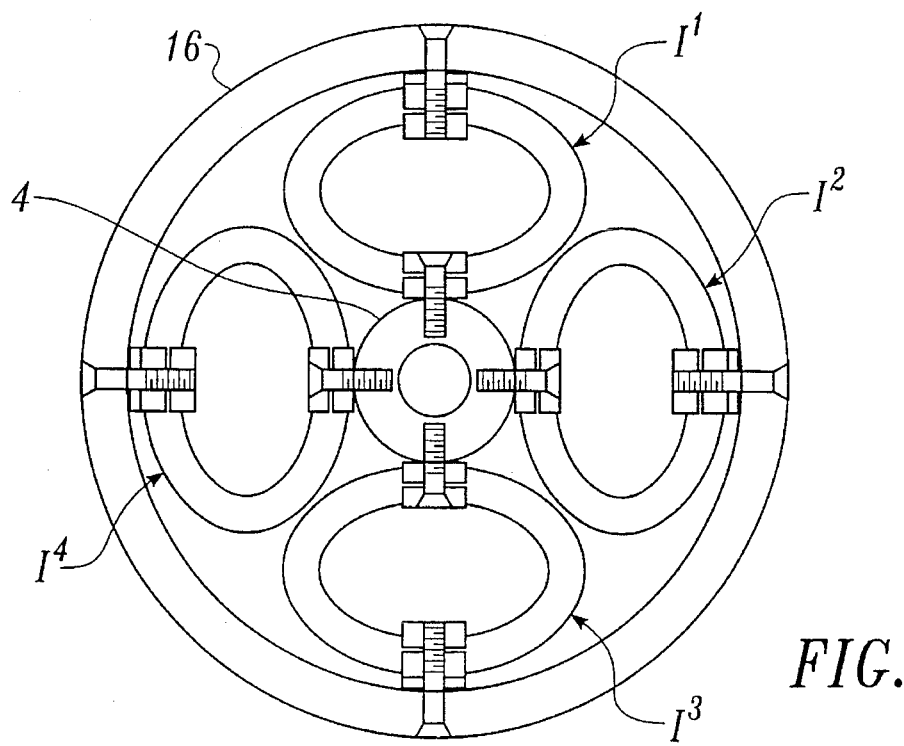
FIG. 16A is a schematic end view showing four isolators assembled into the restraint.

The stiffness properties of the restraint may be altered by incorporating multiple isolators into the design of the restraint. For example, referring to FIG. 15, four sets of isolators $I^1$, $I^2$, $I^3$, $I^4$ are arranged in groups of two along the central cylinder 4 of the restraint. The number of isolator groups may also vary around the central cylinder 4. For example, isolators $I^1$, $I^2$, $I^3$ and $I^4$ are shown in groups of three and four around the central cylinder 4 in FIGS. 16 and 16A respectively.

Referring to the force-deflection curve shown in FIG. 17, the range of the soft portion of the bi-linear stiffness curve of an isolator may be varied by the changing the angle between the bight planes and the amount of precompression the bights are subjected to. FIG. 17 shows the test results from an isolator which had an arrangement of parallel bights which were not precompressed. The range of the soft portion of the curve shown in FIG. 17 may be further increased by precompressing the wire rope bights.

Figure 18:
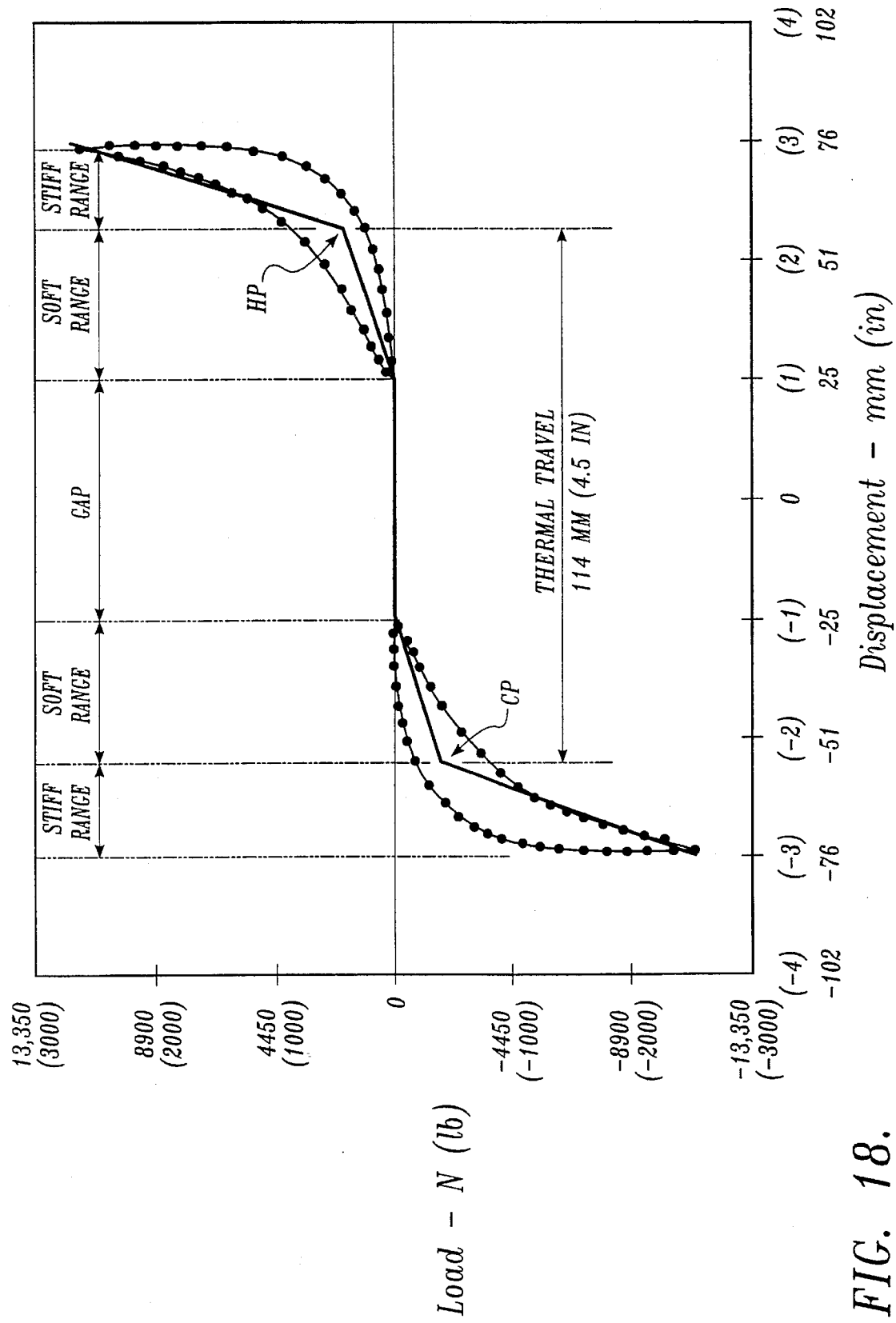
FIG. 18 is a graph illustration of the trilinear force deflection characteristics of a typical device as shown in FIGS. 15 and 15A under, for example, 38 mm (1.5 inches) of precompression and with a 51 mm (2 inch) central rod gap.

Referring to force-deflection curve shown in FIG. 18, the gap and "soft" and "stiff" spring ranges are identified for one particular example of the invention. Based on the pipe having a 114 mm (4.5 inch) thermal travel along the axis of the restraint, one would set the gap and the length of the restraint such that the isolators were deflected to point CP when the pipe was cold. As the pipe expands, the isolators are deflected to the point HP. As the pipe grows, the restoring force which the restraint imposes on the pipe goes from approximately −1335N (−300 lbs.) to 1335N (300 lbs.) The average "gapped soft" spring constant is approximately 21.9 KN/M (125 lb/in.) Once in the hot position, the average spring constant is approximately 263 KN/M (1500 lb/in.) or five times the soft spring constant. This higher spring constant provides for more limited displacements when the pipe is subjected to dynamic loadings. This ratio of spring constants can be varied by the choice of isolators $I^1$, diameter of the tube 16, the relative angle of bight planes, the gap setting, and/or the thickness of spacer plate 30. Because the force deflection curve is symmetric under tensile or compressive loadings, the restraint may be installed such that it elongates as the pipe expands or shortens as the pipe expands. Furthermore, a restraint can provide for various thermal movements by simply adjusting the gap setting.

Accordingly, it will be seen that by means of the described structural arrangement, the invention provides a means for controlling piping displacements due to dynamic loadings including seismic events, fluid induced vibration and equipment induced vibration. The invention geometrically arranges isolators so as to produce a restraint with trilinear force-deflection properties. The invention provides a gap and a "soft" spring range so as to allow for pipe thermal expansion. A "stiff" spring range is provided so as to control pipe dynamic movements. The range of the soft spring is controlled by the choice of the isolator(s) and the amount which the isolator(s) is precompressed. The range and stiffness of the "stiff" ranges are controlled by the choice of the isolator and the gaps between base member 26 and housing end walls 20 and 22. The invention can carry tensile and compressive forces. The invention stabilizes the isolator(s) so as to prevent gross structural buckling of the restraint under compressive loading. A slide bearing 56 limits the stress and amount of radial deflection of the central rod 2 and central cylinder 4. The slide bearing 56 can act as a friction member which absorbs additional energy by choice of its surface and lack of a lubricant. The invention limits the maximum deflection to which the isolators may be subjected by the location of the end walls 20 and 22. The invention utilizes a shear pin 44 to provide a weak link and thus a means of controlling the failure mode of the restraint, absorbing additional one-time energy and limiting the load on the adjacent structure. The invention is simple, requiring no maintenance and has a high cycle fatigue life.

I claim:

1. An improved energy absorption and pipe displacement limiting device for connection between a pipe subject to movement due to dynamic loads and thermal deformation and an adjacent structure the restraint comprising:

a central rod;

a cylinder including walls spaced from and surrounding an intermediate portion of the central rod for axial movement relative thereto;

a first base member mounted at the intermediate portion of the central rod;

a second base member held in place on the walls at a location opposite said first base member;

a sliding bearing or friction member mounted between the second base member and the central rod;

an arrangement of wire energy absorbing rope bights, each of said bights being directly fixed to said first base member and to said second base member which provide a restraint to movement of the central rod relative to the cylinder.

2. An energy absorption and pipe displacement limiting restraint for connection between a pipe subject to movement due to dynamic loads and thermal deformation, and an adjacent structure, the restraint comprising:

a housing including walls spaced outwardly from and surrounding a portion of a central rod, the housing being connected to the central rod to allow axial movement of the central rod relative to the housing;

a first base-forming member coupled to the central rod;

a second base forming member coupled to the housing;

a slide bearing located between the second base-forming member and the central rod;

an arrangement of bights with each of said bights being directly coupled between the first-base forming member and the second base-forming member and providing restraint to movement of the central rod relative to the housing.

3. The restraint of claim 2, wherein the bights are individual lengths of energy absorbing wire rope, each length of rope configured to provide bi-linear spring stiffness properties to the restraint.

4. The restraint of claim 2, wherein the bights are formed from a continuous length of energy-absorbing wire rope that forms near parallel planes to provide bi-linear spring stiffness properties to the restraint.

5. The restraint of claim 2, wherein the bights are arranged in an asymmetric configuration around the central rod.

6. The restraint of claim 2, wherein the relative length of the restraint may be adjusted by threading a rod coupled to the central rod 7. The restraint of claim 2, wherein at least one disk coupled to the central rod determines the length of relative axial movement of the central rod with respect to the housing.

8. The restraint of claim 2, wherein the size of a spacer located between at least one of the first base-forming member and the central rod and the second base-forming member and the housing determines an extent of precompression of the bights.

9. The restraint of claim 2, wherein the slide bearing limits the deflection and bending stresses of the central rod during axial displacement due to an unsymmetric bight arrangement.

10. The restraint of claim 2, wherein the slide bearing acts as a friction member that absorbs energy as a function of the amount of axial displacement of the central rod with respect to the housing.

11. The restraint of claim 10, wherein the slide bearing provides an increasing force in response to an increasing axial displacement of the central rod with respect to the housing.

12. The restraint of claim 2, wherein at least part of the bights are located external to the housing to provide for ease of inspection of the bights.

13. An energy absorption and pipe displacement limiting restraint for connection between a pipe subject to movement due to dynamic loads and thermal deformation, and an adjacent structure, the restraint comprising:

a housing including walls spaced outward from and at least partially surrounding a portion of a central rod so as to allow axial movement of the central rod relative to the housing;

a first base-forming member coupled to the central rod;

a second base-forming member coupled to the housing; and an arrangement of bights, each of said bights being directly coupled to said first and second base-forming members in a configuration that provides a restraint having tri-linear force-deflection properties.

* * * * *

UNITED STATES PATENT AND TRADEMARK OFFICE
CERTIFICATE OF CORRECTION

PATENT NO. : 5,482,259  Page 1 of 2
DATED : January 9, 1996
INVENTOR(S) : L.A. Loziuk It is certified that error appears in the above-indentified patent and that said Letters Patent is hereby corrected as shown below:

| COLUMN | LINE | |
|---|---|---|
| [63] | Rel. U.S. App. Data | "Nov. 19," should read --Nov. 18,-- |
| [56] | Refs. Cited Other Pubs. | "(Toshibakk)" should read --(TOSHIBA KK) |
| 1 | 45 | "mount" should read --amount-- |
| 2 | 50 | "mounts" should read --amounts-- |
| 6 | 48 | "robe" should read --tube-- |
| 10 | 27 | "beating" should read --bearing-- |
| 10 | 31 | "beating" should read --bearing-- |
| 11 | 44 | "beatings" should read --bearings-- |
| 11 | 65 | "beating" should read --bearing-- |
| 12 | 12 | "beating" should read --bearing-- |
| 12 | 46 | "robe" should read --tube-- |
| 12 | 65 | "ting" should read --ring-- |
| 13 | 48 | "beating" should read --bearing-- |

UNITED STATES PATENT AND TRADEMARK OFFICE
CERTIFICATE OF CORRECTION

PATENT NO. : 5,482,259
DATED : January 9, 1996
INVENTOR(S) : L.A. Loziuk

It is certified that error appears in the above-indentified patent and that said Letters Patent is hereby corrected as shown below:

| COLUMN | LINE | |
|---|---|---|
| 15 | 14 | "beating" should read --bearing--. |

Signed and Sealed this

Fourteenth Day of May, 1996

BRUCE LEHMAN

*Attest:*

*Attesting Officer*        *Commissioner of Patents and Trademarks*